US010562187B2

(12) United States Patent
Tsukamoto et al.

(10) Patent No.: US 10,562,187 B2
(45) Date of Patent: Feb. 18, 2020

(54) ROBOT, ROBOT CONTROL DEVICE, AND ROBOT SYSTEM

(71) Applicant: Seiko Epson Corporation, Tokyo (JP)

(72) Inventors: Kentaro Tsukamoto, Azumino (JP); Nobuyuki Setsuda, Okaya (JP)

(73) Assignee: Seiko Epson Corporation (JP)

( * ) Notice: Subject to any disclaimer, the term of this patent is extended or adjusted under 35 U.S.C. 154(b) by 241 days.

(21) Appl. No.: 15/689,424

(22) Filed: Aug. 29, 2017

(65) Prior Publication Data

US 2018/0056516 A1 Mar. 1, 2018

(30) Foreign Application Priority Data

Aug. 31, 2016 (JP) .................................. 2016-168961

(51) Int. Cl.
*B25J 9/16* (2006.01)
*B25J 19/04* (2006.01)
*B25J 13/08* (2006.01)
*B25J 9/00* (2006.01)

(52) U.S. Cl.
CPC ........... *B25J 9/1697* (2013.01); *B25J 9/0093* (2013.01); *B25J 9/1628* (2013.01); *B25J 13/08* (2013.01); *B25J 19/04* (2013.01)

(58) Field of Classification Search
CPC ...... B25J 9/1697; B25J 9/1656; B25J 9/0093; B25J 19/04; B25J 9/1628; B25J 13/08; G05B 2219/32128
USPC ................................................ 700/245, 259
See application file for complete search history.

(56) References Cited

U.S. PATENT DOCUMENTS

| 8,014,628 | B2* | 9/2011 | Shimodaira | G06K 9/346 382/103 |
| 8,073,190 | B2* | 12/2011 | Gloudemans | G06T 15/20 345/419 |
| 8,154,633 | B2* | 4/2012 | Gloudemans | G06T 7/60 348/157 |
| 8,441,476 | B2* | 5/2013 | Gloudemans | G06K 9/346 345/419 |
| 2009/0202172 | A1* | 8/2009 | Shimodaira | G06K 9/346 382/275 |
| 2012/0207379 | A1* | 8/2012 | Shimodaira | G06K 9/34 382/141 |
| 2012/0262487 | A1* | 10/2012 | Huebner | G06F 3/016 345/634 |
| 2014/0241614 | A1* | 8/2014 | Lee | H04N 13/254 382/154 |

FOREIGN PATENT DOCUMENTS

JP 2003-227706 A 8/2003

* cited by examiner

*Primary Examiner* — Jaime Figueroa
(74) *Attorney, Agent, or Firm* — Harness, Dickey & Pierce, P.L.C.

(57) ABSTRACT

The robot that is configured to display a third image related to a second image when a first operation is accepted and a first image is picked up and the second image included in the first image is selected, to set a condition for a process on an object whose image is picked up when an information of the third image is accepted, and to carry out the process based on the set condition.

5 Claims, 14 Drawing Sheets

ROBOT, ROBOT CONTROL DEVICE, AND ROBOT SYSTEM

BACKGROUND

1. Technical Field

The present invention relates to a robot, a robot control device, and a robot system.

2. Related Art

According to the related-art, there has been a technique of extracting pixels with luminance values within a specific range from an acquired multi-valued image and acquiring an aggregate (blob) based on the connectivity of the extracted pixels.

However, if no correspondence is established between a specific blob in an image and information of this specific blob (for example, information of its area or coordinates), it may be difficult for a person to intuitively understand the correspondence between a blob and information of this blob. Such a problem is particularly prominent when many blobs are detected.

As an example, in an image measuring device disclosed in JP-A-2003-227706, a number is displayed at a detection target in an image, and a number corresponding to information of this detection target is attached. In this technique, a number is displayed in an image, and information corresponding to the number is displayed on another screen. Thus, the correspondence between a blob and information of this blob is established, for example, even when many blobs are extracted.

However, with this technique, too much information may be displayed in an image when the number of detected blobs is large. Also, with this technique, it may be necessary to scroll over a result list or designate a number in order to acquire information of a desired blob. Therefore, it may be difficult for a person to intuitively understand the correspondence between a blob and information of this blob. Such a problem is particularly prominent when many blobs are detected.

As described above, with the related-art technique, it may be difficult for a person to intuitively understand the correspondence between a detection target and information of this detection target.

An example of the detection target is a blob. However, the same problem arises with other targets.

SUMMARY

An aspect of the invention is directed to a robot in which, when a first operation is accepted and a second image included in a first image that is picked up is selected, a third image related to the second image is displayed, when information of the third image is accepted, a condition for processing on an object whose image is picked up is set based on the information, and the processing is carried out based on the set condition.

With this configuration, in the robot, when a first operation is accepted and a second image included in a first image that is picked up is selected, a third image related to the second image is displayed. When information of the third image is accepted, a condition for processing on an object whose image is picked up is set based on the information. The processing is carried out based on the set condition. Thus, in the robot, the displaying of the third image related to the second image, the setting of the condition for processing based on the information of the third image, and the execution of the processing can be carried out efficiently.

In the aspect, the robot may be configured such that the second image is an image corresponding to a first target and that the third image includes a numerical value related to the first target.

With this configuration, in the robot, the second image is an image corresponding to a first target, and the third image includes a numerical value related to the first target. Thus, in the robot, the displaying the third image (image including the numerical value related to the first target) related to the second image (image corresponding to the first target), the setting of the condition for processing based on the information of the third image, and the execution of the processing can be carried out efficiently.

In the aspect, the robot may be configured such that a display of the second image is highlighted in the first image when the first operation is accepted.

With this configuration, in the robot, the display of the second image is highlighted in the first image when the first operation is accepted. Thus, the second image can be made more visible and the second image can be made easy for the user to grasp.

In the aspect, the robot may be configured such that the third image is displayed along with the first image.

With this configuration, in the robot, the third image is displayed along with the first image. Thus, in the robot, the corresponding relationship between the first image and the third image can be made easy for the user to visually grasp.

In the aspect, the robot may be configured such that the second image is an image corresponding to a second target, that the third image includes a numerical value related to the second target, and that when a second operation is accepted and a fourth image related to the second target included in the third image is selected, a fifth image related to the fourth image is displayed.

With this configuration, in the robot, the second image is an image corresponding to a second target. The third image includes a numerical value related to the second target. When a second operation is accepted and a fourth image related to the second target included in the third image is selected, a fifth image related to the fourth image is displayed. Thus, in the robot, the displaying of the fifth image related to the fourth image can be carried out efficiently.

In the aspect, the robot may be configured such that when the second operation is accepted, a display of the fourth image is highlighted in the third image.

With this configuration, in the robot, when the second operation is accepted, the display of the fourth image is highlighted in the third image. Thus, the fourth image can be made more visible and the fourth image can be made easy for the user to grasp.

In the aspect, the robot may be configured such that the fifth image is displayed along with the third image.

With this configuration, in the robot, the fifth image is displayed along with the third image. Thus, in the robot, the corresponding relationship between the third image and the fifth image can be made easy for the user to visually grasp.

Another aspect of the invention is directed to a robot control device that causes the robot described above to carry out the processing.

With this configuration, the robot control device causes the robot to carry out the processing. Thus, with the robot control device, the robot can efficiently carry out the displaying of the third image related to the second image, the setting of the condition for processing based on the information of the third image, and the execution of the processing.

Another aspect of the invention is directed to a robot system including: the robot described above; and a robot control device which controls the robot.

With this configuration, the robot system includes: a robot; and a robot control device which controls the robot. Thus, with the robot system, the robot can efficiently carry out the displaying of the third image related to the second image, the setting of the condition for processing based on the information of the third image, and the execution of the processing.

As described above, with the robot, the robot control device and the robot system according to some aspects of the invention, in the robot, when a first operation is accepted and a second image included in a first image that is picked up is selected, a third image related to the second image is displayed. When information of the third image is accepted, a condition for processing on an object whose image is picked up is set based on the information. The processing is carried out based on the set condition. Thus, with the robot, the robot control device and the robot system according to some aspects of the invention, the robot can efficiently carry out the displaying of the third image related to the second image, the setting of the condition for processing based on the information of the third image, and the execution of the processing.

BRIEF DESCRIPTION OF THE DRAWINGS

The invention will be described with reference to the accompanying drawings, wherein like numbers reference like elements.

FIG. 11 shows an example of a screen displayed in blob processing according to an embodiment of the invention.

FIG. 12 shows an example of a screen displayed in blob processing according to an embodiment of the invention.

FIG. 13 shows an example of a screen displayed in blob processing according to an embodiment of the invention.

FIG. 14 shows an example of a screen displayed in blob processing according to an embodiment of the invention.

DESCRIPTION OF EXEMPLARY EMBODIMENTS

Figure 1:
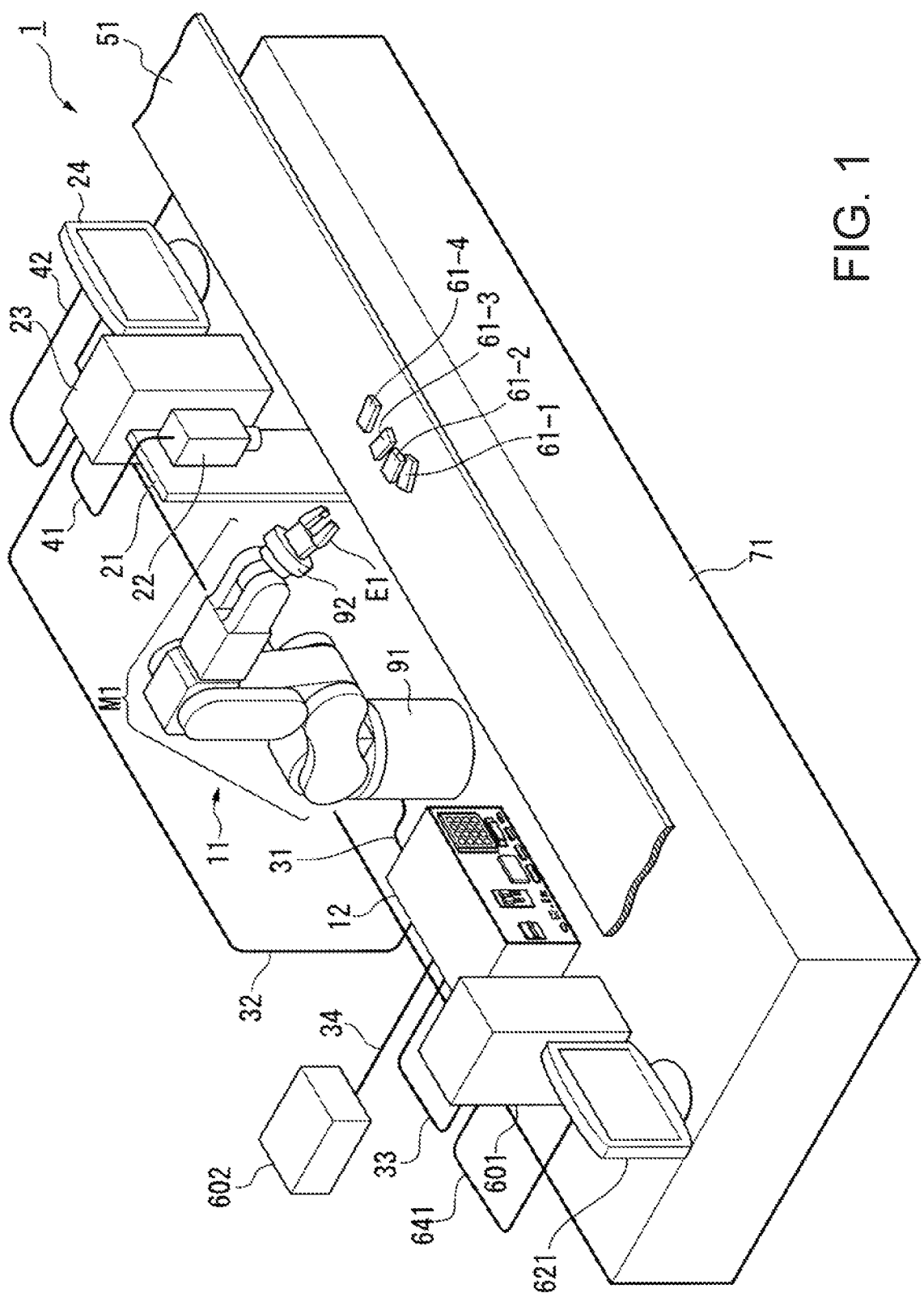
FIG. 1 shows a schematic configuration example of a robot system according to an embodiment of the invention.

Embodiments of the invention will be described in detail with reference to the drawings.
Robot System FIG. 1 shows a schematic configuration example of a robot system 1 according to an embodiment of the invention.

The robot system 1 includes a robot 11, a robot control device 12, a support unit 21, a camera 22, an image processing device 23, a display device 24, a personal computer for development (development PC) 601, an operation key 602, a display device 621, a cable 31 connecting the robot 11 and the robot control device 12 in a way that enables communication between these, a cable 32 connecting the robot control device 12 and the image processing device 23 in a way that enables communication between these, a cable 33 connecting the development PC 601 and the robot control device 12 in a way that enables communication between these, a cable 34 connecting the operation key 602 and the robot control device 12 in a way that enables communication between these, a cable 41 connecting the camera 22 and the image processing device 23 in a way that enables communication between these, a cable 42 connecting the image processing device 23 and the display device 24 in a way that enables communication between these, a cable 641 connecting the development PC 601 and the display device 621 in a way that enables communication between these, a conveyor belt 51, a plurality of (in the example of FIG. 1, four) target objects 61-1 to 61-4, and a table 71.

In this embodiment, it is understood that all of the components shown in FIG. 1 are included in the robot system 1. However, as another example, it may be understood that the robot 11, the robot control device 12, and the cable 31 connecting the robot 11 and the robot control device 12 in a way that enables communication between these are included in the robot system 1, and that an arbitrary one or more of the other components is not included in the robot system 1.

As communication interfaces, a wireless channel that enables communication may be used instead of the arbitrary wired cables 31 to 34, 41, 42, and 641.

In the example of FIG. 1, all but the operation key 602, of the components except the table 71, are placed and arranged on the table 71.

Here, a part of the components other than the operation key 602, such as the robot 11, may be arranged outside the table 71 (for example, on the floor or the like).

The table 71 need not necessarily be used. All of the components may be arranged on the floor or the like.

The conveyor belt 51 moves an object placed on the conveyor belt 51, in a predetermined direction. In this embodiment, this direction is a direction from a position where an image of the object is picked up by the camera 22 toward a position where work is carried out on the object by the robot 11.

In the example of FIG. 1, the plurality of target objects 61-1 to 61-4 are placed and moved on the conveyor belt 51.

In the example of FIG. 1, a part of the conveyor belt 51 is shown. As an example, the conveyor belt 51 continues from an arbitrary start point (not illustrated) to an arbitrary endpoint (not illustrated). As another example, the conveyor belt 51 may be looped.

Arbitrary work may be carried out on the target objects 61-1 to 61-4 placed and moved on the conveyor belt 51, at a site (not illustrated) other than the work site by the robot 11 according to the embodiment.

In the embodiment, the target objects 61-1 to 61-4 are placed and moved on the conveyor belt 51. However, as another configuration example, the target objects 61-1 to 61-4 may be placed on a stage and arranged in a quiescent state. The stage may be the table 71 or another object.

The target objects 61-1 to 61-4 are an example of workpieces used in the work carried out by the robot 11.

Arbitrary objects may be used as the target objects 61-1 to 61-4. The target objects 61-1 to 61-4 may be, for example, living bodies or not living bodies.

The support unit 21 is a member which fixedly supports the camera 22 at a predetermined position.

The camera 22 is an image pickup device which picks up an image covering a predetermined range. In the example of FIG. 1, as the predetermined range, the range where the target objects 61-1 to 61-4 on the conveyor belt 51 is used. That is, in the example of FIG. 1, the camera 22 is provided at a predetermined position on the support unit 21 in such an arrangement that the camera 22 can capture in its field of view the target objects 61-1 to 61-4 placed and moved on the conveyor belt 51 and pick up an image of the target objects 61-1 to 61-4. In the example of FIG. 1, the camera 22 is arranged in such a way that the optical axis of image pickup by the camera 22 is orthogonal to the surface of the conveyor belt 51 (that is, the surface of the conveyor belt 51 and the image pickup plane are parallel to each other).

The camera 22 transmits information of the image that is picked up (image data) to the image processing device 23 via the cable 41.

In the embodiment, the case where the camera 22 is fixedly arranged is described. However, as another configuration example, the range whose image is picked up by the camera 22 may be changeable.

As another configuration example, another device may be used instead of the camera 22, as the device for measuring information such as the shape of the target objects 61-1 to 61-4. For example, a measuring device using a laser may be used.

The image processing device 23 receives the information of the image transmitted from the camera 22 via the cable 41. The image processing device 23 performs predetermined image processing on the received information of the image and transmits the information of the result of the image processing to the robot control device 12 via the cable 32. The information of the result of the image processing may include the information of the image transmitted from the camera 22 (the information of the image before the image processing). As an example, the image processing device 23 may be configured using a computer.

The display device 24 is, for example, a display device which displays information on a screen. The display device 24 receives information transmitted from the image processing device 23 via the cable 42 and displays the received information on the screen.

The image processing device 23 outputs (transmits) information to be a display target, to the display device 24. As the information to be a display target, for example, information of an image picked up by the camera 22 may be used, or information of the result of image processing carried out by the image processing device 23 may be used. Alternatively, information of the result of processing carried out by the robot control device 12 may be used.

At the time of development, a part or the entirety of the image processing and display control or the like carried out by the image processing device 23 may be carried out under the control of the development PC 601.

In the example of FIG. 1, it can be understood that an image processing system having the image processing device 23 is provided in the robot system 1. The image processing system may include, for example, the camera 22. The image processing system may also include, for example, the display device 24.

The image processing system may be, for example, an image measuring system which measures an image.

Single-Arm Robot

In this embodiment, the robot 11 is a single-arm robot.

The robot 11 has a proximal end (support stage) 91, a manipulator M1, a force sensor 92, and an end effector E1.

In the embodiment, the robot control device 12 is provided as a separate body from the robot 11. As another configuration example, the robot control device 12 may be provided as a unified body with the robot 11, and for example, may be provided inside the proximal end 91 of the robot 11.

The proximal end 91 of the robot 11 is installed.

One end of the manipulator M1 of the robot 11 is connected to the proximal end 91. The other end of the manipulator M1 of the robot 11 and the end effector E1 are connected via the force sensor 92.

The manipulator M1 of the robot 11 has a six-axis vertical multi-joint structure and has six joints. Each joint has an actuator (not illustrated). The robot 11 carries out operations with a degree of freedom based on the six axes by the operation of the actuator of each of the six joints. As another configuration example, a robot which carries out operations with a degree of freedom based on five or fewer axes, or a robot which carries out operations with a degree of freedom based on seven or more axes may be used.

The end effector E1 of the robot 11 is, for example, a hand and has a finger part capable of gripping an object. As another configuration example, the end effector E1 of the robot 11 may be an arbitrary member and may be, for example, a member which sucks an object using air suction, or a member which attracts an object using a magnetic force.

Development PC

The development PC 601 is used when developing a program to be used in the robot control device 12 or the like. The program is, for example, a program for controlling operations of the robot 11.

The development PC 601 communicates with the robot control device 12 via the cable 33.

Also, the development PC 601 may be disconnected from the robot control device 12, for example, after the development is completed.

The development PC 601 has, for example, the function of setting a condition for predetermined processing carried out by the robot 11. As the condition for processing, an arbitrary condition may be used. For example, a value or range of a parameter used in the processing (which may also be called a "property" or the like) may be used.

In the embodiment, the development PC 601 gives a command (instruction) to the image processing device 23 via the robot control device 12 at the time of development. Thus, various kinds of processing are carried out. Also, at the time of development, for example, an operation unit provided in the development PC 601 is operated by the user.

The display device 621 is, for example, a display device which displays information on the screen. The display device 621 receives information transmitted from the development PC 601 and displays the received information on the screen.

The development PC 601 outputs (transmits) information to be a display target, to the display device 621. As the information to be a display target, for example, information of an image picked up by the camera 22 may be used, or information of the result of image processing carried out by the image processing device 23 may be used. Alternatively, information of the result of processing carried out by the robot control device 12 may be used.

In the embodiment, the development PC 601 gives an instruction to execute image processing, to the image processing device 23. The image processing device 23 transmits an image and a result of image processing to the development PC 601. The development PC 601 causes the display device 621 to display the image and the result of image processing that are received.

In the embodiment, at the time of development, various kinds of information are displayed on the display device 621 of the development PC 601 as a principal (main) display device.

Meanwhile, on the display device 24 of the image processing device 23, information similar to that on the display device 621 of the development PC 601 may be displayed, or other information may be displayed. In the embodiment, the display device 24 of the image processing device 23 is used as an auxiliary (sub) display device. For example, the display device 24 of the image processing device 23 may display a target object which is in automatic operation, or may display a result.

Robot Control Device

The robot control device 12 controls the robot 11. For example, the robot control device 12 controls each of the respective actuators provided in the manipulator M1, the force sensor 92, and the end effector E1.

The robot control device 12 receives information of the result of detection from the force sensor 92.

The robot control device 12 also receives information of the result of image processing transmitted from the image processing device 23, via the cable 32.

In a configuration where the arrangement of the camera 22 is changeable, the robot control device 12 may be able to control and change the arrangement of the camera 22. In this case, the robot control device 12 may, for example, directly control the camera 22, or may control the camera 22 via the image processing device 23.

The robot control device 12 also communicates with the development PC 601 via the cable 33.

The robot control device 12 also communicates with the operation key 602 via the cable 34.

The operation key 602 is an example of an operation device provided on the outside of the robot control device 12. The operation key 602 has an operation unit operated by the user (for example, one or more keys), accepts the content of an operation carried out on the operation unit by the user, and transmits the content of the operation to the robot control device 12 via the cable 34.

Figure 2:
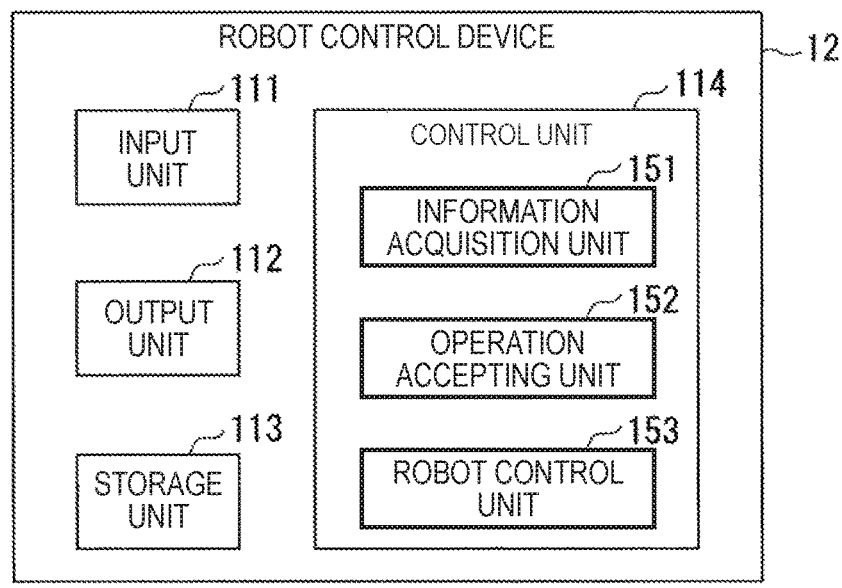
FIG. 2 shows a schematic configuration example of a robot control device according to an embodiment of the invention.

FIG. 2 shows a schematic configuration example of the robot control device 12 according an embodiment of the invention.

The robot control device 12 has an input unit 111, an output unit 112, a storage unit 113, and a control unit 114.

The control unit 114 has an information acquisition unit 151, an operation accepting unit 152, and a robot control unit 153.

The input unit 111 inputs information from outside. As an example, the input unit 111 has an operation unit such as a keyboard or mouse, and inputs information corresponding to the content of an operation carried out on the operation unit by the user (person). As another example, the input unit 111 inputs information outputted from an external device. In the example of FIG. 1, the input unit 111 inputs (receives), for example, information outputted (transmitted) from the image processing device 23, the development PC 601 or the operation key 602, or inputs (receives) information outputted (transmitted) from the force sensor 92.

The output unit 112 outputs information to outside. As an example, the output unit 112 outputs (transmits) information to a display screen. As another example, the output unit 112 may output (transmit) information of a sound to a speaker which produces a sound (including a voice). The output unit 112 also outputs information, for example, to the robot 11 (for example, the manipulator M1 and the end effector E1), the development PC 601, the image processing device 23, or the operation key 602.

In the embodiment, the robot control device 12 and the display device 24 are not connected to each other. However, as another configuration example, the display device 24 may be connected to the output unit 112 of the robot control device 12, as a unified body or a separate body.

The operation unit provided in the input unit 111 may be, for example, a touch panel using a display screen (or another screen).

The storage unit 113 stores information. As an example, the storage unit 113 stores information of a program (control program) and various parameters used by the control unit 114. As another example, the storage unit 113 may store arbitrary information and may store, for example, information of an image or the like used when controlling the robot 11.

The control unit 114 performs various kinds of control in the robot control device 12. The control unit 114 performs various kinds of control, for example, based on the information of the program and various parameters stored in the storage unit 113.

The information acquisition unit 151 acquires information. The information acquisition unit 151 acquires, for example, one or more of the information inputted by the input unit 111 and the information stored in the storage unit 113.

The operation accepting unit 152 accepts an operation carried out by the user on the operation unit provided in the input unit 111. The operation accepting unit 152 also accepts and receives, from the operation key 602, an operation carried out by the user on the operation unit provided in the operation key 602.

The robot control unit 153 controls operations of the robot 11. Specifically, the robot control unit 153 controls operations of the manipulator M1 by communicating with the manipulator M1 and controls operations of the end effector E1 by communicating with the end effector E1.

Operations Carried Out in Robot System

Display of Various Images

In the embodiment, the camera 22 picks up an image of the target objects 61-1 to 61-4.

The image processing device 23 binarizes the image based on the information of the picked-up image and detects an aggregate of pixels (blob) based on the connectivity of pixels having the same pixel values in the binarized image.

Here, there can be a case where, inside an area recognized as one blob having the same pixel value (here, referred to as a "pixel value A1" for the sake of convenience of the description), a part (for example, a hole-like part) having a different pixel value (here, referred to as a "pixel value A2" for the sake of convenience of the description) exists.

In this case, as an example, the image processing device 23 may execute processing in which the pixel value of the part (for example, a hole-like part) having the different pixel value (pixel value A2) is changed to the same pixel value (pixel value A1) so as to regard this part as a part of the blob. In this processing, the entire area inside an outer frame (outer contour) of each blob is an area of the blob.

As another example, the image processing device 23 may execute processing in which the part (for example, a hole-like part) having the different pixel value (pixel value A2) is left as it is and not regarded as a part of the blob. In this processing, inside an outer frame (outer contour) of each blob, there can be one or more frames (inner contours) separating a part that is not the blob.

The image processing device 23 also detects a characteristic value (numerical value) of each detected blob. The characteristic value may be an arbitrary value. In the embodiment, an area value, or X-coordinate and Y-coordinate values on a predetermined X-Y orthogonal coordinate system are used. The X-Y orthogonal coordinate system may be, for example, a coordinate system where the horizontal direction (lateral direction) of an image is the X-axis direction and where the vertical direction (longitudinal direction) of the image is the Y-axis direction.

The image processing device 23 transmits information about the result of blob detection to the robot control device 12 via the cable 32.

Here, an arbitrary value may be used as a threshold for binarization. The image processing device 23 binarizes the pixel value (for example, luminance value) of each pixel included in an image, for example, by setting a value 1 if the pixel value is above a predetermined threshold and setting a value 0 if the pixel value is below the predetermined threshold.

The image processing device 23 may also carry out processing of detecting a blob in an image part corresponding to a range designated (selected) by the user, of a picked-up image.

The designating operation carried out by the user may be carried out, for example, using the operation unit provided in the development PC 601. As another configuration example, this operation may be carried out using another operation unit (for example, the operation unit provided in the image processing device 23, the robot control device 12 or the operation key 602).

For each of the detected blobs, the image processing device 23 gives the same identification information to the blob and the characteristic value about the blob. As the identification information, for example, information of serial numbers may be used. The order of the serial numbers may be an arbitrary order and may be, for example, in order from the largest to the smallest areas. The order of the serial numbers, for example, may also be designated by the user or may be automatically allocated.

The designating operation carried out by the user may be carried out, for example, using the operation unit provided in the development PC 601. As another configuration example, this operation may be carried out using another operation unit (for example, the operation unit provided in the image processing device 23, the robot control device 12 or the operation key 602).

Figure 3:
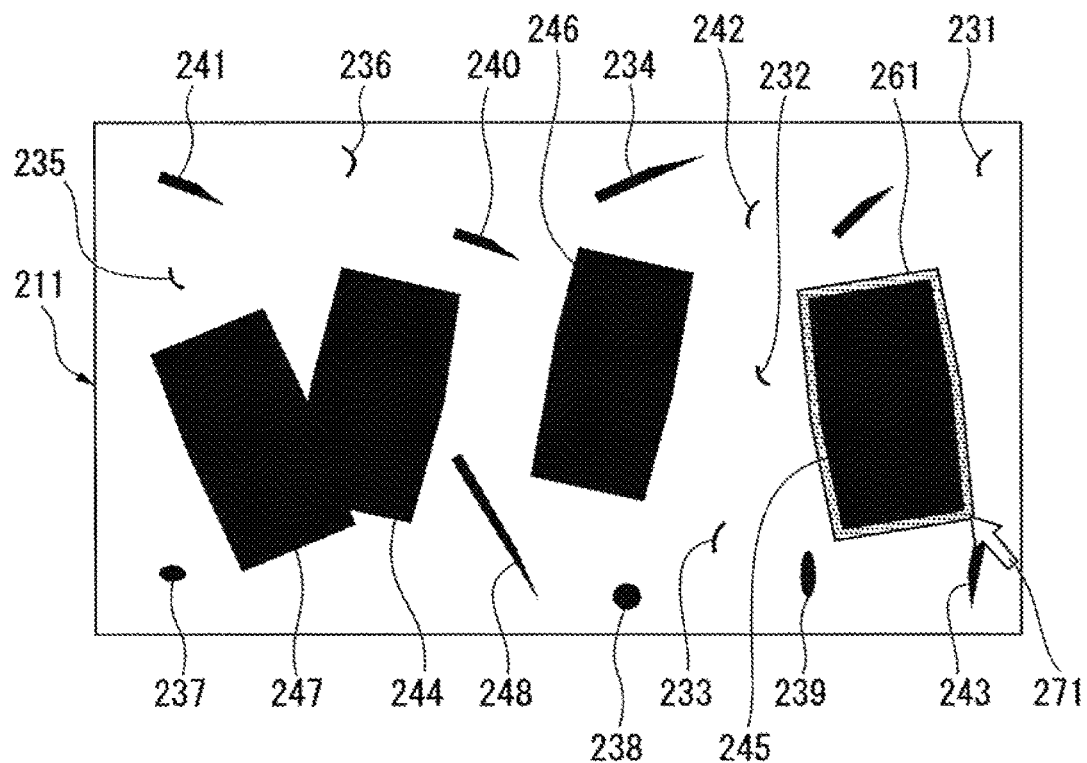
FIG. 3 shows an example of an image of a result of blob detection according to an embodiment of the invention.

FIG. 3 shows an example of an image 211 of the result of blob detection according to an embodiment of the invention.

In the embodiment, the development PC 601 displays the image 211 on the screen of the display device 621.

The image 211 includes a plurality of (in the example of FIG. 3, 18) blobs 231 to 248. In the example of FIG. 3, an aggregate of pixels with the value 0 (black) is the blobs 231 to 248, which can be target objects (in the example of FIG. 1, the target objects 61-1 to 61-4), and pixels with the value 1 (white) are regarded as background.

In the example of FIG. 3, the four blobs 244 to 247 represent the target objects and the other blobs 231 to 243 and 248 represent objects other than the target objects. The objects other than the target objects include, for example, scratches or uneven colors existing on the conveyor belt 51 (a stage or the like as another configuration example), or noises generated at the time of shooting the image (here, regarded as objects for the sake of convenience of the description).

The image processing device 23 performs control in such a way that an image of a cursor 271 is displayed as superimposed on the image 211. The image processing device 23 causes the cursor 271 to move on the image 211 in response to a moving operation carried out by the user. This operation is carried out, for example, using the operation unit provided in the development PC 601.

The image processing device 23 also accepts the designation (selection) of a position of the cursor 271 (or a target corresponding to the cursor 271) on the image 211 in response to a clicking operation carried out by the user (for example, an operation on the development PC 601). The user clicks on the cursor 271 at a desired position on the image 211.

When the designation of an arbitrary one of the blobs 231 to 248 by the cursor 271 is accepted, the image processing device 23 performs control to highlight the blob whose designation is accepted. In the example of FIG. 3, one blob 245 is designated. The image processing device 23 highlights the blob 245 by performing control to display a contour 261 around the blob 245. The contour 261 is, for example, in a color that is not used for the blobs 231 to 248 or the background, and may be red, blue, or yellow.

Figure 4:
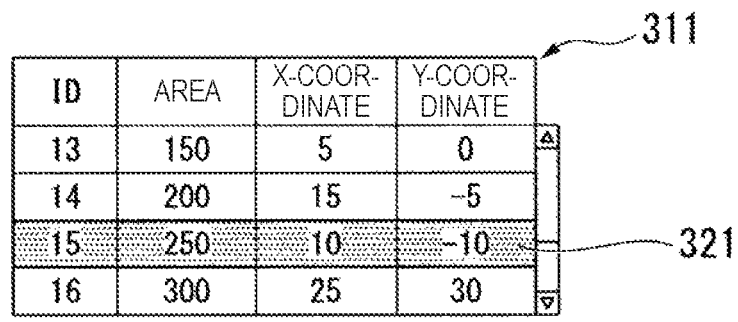
FIG. 4 shows an example of an image of a feature information table according to an embodiment of the invention.

FIG. 4 shows an example of an image of a feature information table (feature information table image 311) according to an embodiment of the invention.

When the blob 245 is designated in the image 211 shown in FIG. 3, the image processing device 23 generates a feature information table image 311 including a characteristic value about the designated blob 245. The feature information table image 311 is displayed on the screen of the display device 621.

In the examples of FIG. 3 and FIG. 4, it is assumed that identification information "15" is allocated (given) to the designated blob 245. In the embodiment, serial numbers, starting with 0 as an initial value and increasing one by one, are used as the identification information. In the example of FIG. 4, the identification information is expressed as "ID".

In the example of FIG. 4, the feature information table image 311 showing information of four blobs which are a part of the plurality of detected blobs 231 to 248 and which have identification information around and including the identification information of the designated blob 245 (blobs having identification information "13" to "16") is shown. The information of the blob whose identification information is "15" includes a value "250" as its area, a value "10" as its X-coordinate, and a value "−10" as its Y-coordinate.

In the example of FIG. 4, in the feature information table image 311, the identification information is described in order in one direction (for example, longitudinal direction), of two directions orthogonal to each other, and a numerical value expressing the area, a numerical value expressing the X-coordinate, and a numerical value expressing the Y-coordinate for the blob having the corresponding identification information are described in the other direction (for example, lateral direction). Here, as the coordinates (X, Y) of a blob, for example, the coordinates of the centroid (or geometric center) of this blob may be used.

In the example of FIG. 4, in the feature information table image 311, a bar which designates scrolling in the one direction (for example, longitudinal direction) is displayed. The image processing device 23 causes the feature information table image 311 to be scrolled up and down in the one direction in response to a scrolling operation carried out by the user. Such a scroll function may be provided, for example, with respect to an arbitrary one or both of the one direction and the other direction.

In the example of FIG. 4, the image processing device 23 highlights a designated row (designated row 321) by displaying it in a different color from the other rows in the feature information table image 311. This color is, for example, a color that is not already used in the feature information table image 311 and may be, for example, red, blue, or yellow.

As the highlighting in the example of FIG. 3 or the highlighting in the example of FIG. 4, for example, display forms other than displaying a contour or row in a highlighted color may be used. For example, displaying a contour or row in a bold line, displaying a contour or row in a flashing state, or the like, may be used.

The image processing device 23 accepts the designation (selection) of a position of a cursor (not illustrated) (or an object corresponding to the cursor) in the feature information table image 311 in response to a clicking operation carried out by the user (for example, an operation on the development PC 601). The user clicks on the cursor at a desired position (for example, on a desired row or the like) in the feature information table image 311.

As another example, in the feature information table image 311, a button or the like may be displayed beside the identification (ID) section in each row, and the designation of each row may be accepted at the position of the button or the like.

The image processing device 23 may also have the function of rearranging (sorting) the information of the plurality of blobs 231 to 248 in the feature information table image 311. As an example, the image processing device 23 displays the feature information table image 311 where the information of the plurality of blobs 231 to 248 is rearranged, based on a rearrangement rule specified by an operation carried out by the user (for example, an operation on the development PC 601). As another example, the image processing device 23 displays the feature information table image 311 where the information of the plurality of blobs 231 to 248 is rearranged, based on a predetermined rearrangement rule. As the rearrangement rule, an arbitrary rule may be used. For example, a rule that the information is rearranged in order from the largest area to the smallest, a rule that the information is rearranged in order from the smallest area to the largest, a rule that the information is rearranged in order from the largest X-coordinate or Y-coordinate to the smallest, or a rule that the information is rearranged in order from the smallest X-coordinate or Y-coordinate to the smallest, or the like, may be used.

Figure 5:
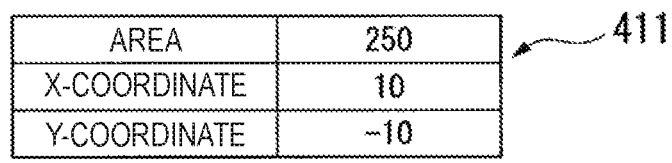
FIG. 5 shows an example of an image of feature information according to an embodiment of the invention.

FIG. 5 shows an example of an image feature information (feature information image 411) according an embodiment of the invention.

When the row of one blob (designated row 321) is designated in the feature information table image 311 shown in FIG. 4, the image processing device 23 generates an image (feature information image 411) including information of a characteristic value about the designated blob (blob 245). The feature information image 411 is displayed on the screen of the display device 621.

In the example of FIG. 5, the feature information image 411 includes the information of the characteristic value about the blob, only for the designated blob (blob 245).

In this embodiment, the image processing device 23 is configured to perform control in such a way that when the blob 245 is designated in the image 211 shown in FIG. 3, the feature information table image 311 shown in FIG. 4 corresponding to the designated blob 245 is displayed, and that when the designated row 321 is designated in the feature information table image 311 shown in FIG. 4, the feature information image 411 shown in FIG. 5 corresponding to the designated row 321 is displayed. Moreover, the image processing device 23 may carry out, for example, processing of returning to the display content of FIG. 4 from the display content of FIG. 5 or processing of returning to the display content of FIG. 3 from the display content of FIG. 4 in response to an operation of returning to the display content immediately before (for example, an operation on the development PC 601), carried out by the user and accepted.

As another configuration example, the image processing device 23 may be configured to perform control in such a way that when the blob 245 is designated in the image 211 shown in FIG. 3, the feature information image 411 shown in FIG. 5 corresponding to the blob 245 is displayed. The image processing device 23 may also carry out processing of returning to the display content of FIG. 3 from the display content of FIG. 5 in response to an operation of returning to the display content immediately before (for example, an operation on the development PC 601), carried out by the user and accepted.

As another configuration example, the image processing device 23 may be configured to perform control in such a way that when a row corresponding to a predetermined blob (designated row 321) is designated in the feature information table image 311 shown in FIG. 4, an image including the blob corresponding to the row is displayed. This image may be an image of the designated blob only, or may be an image including the designated blob and other blobs, like the image 211 shown in FIG. 3.

The image processing device 23 may perform control in such a way that arbitrary two or three, of the display content of FIG. 3, the display content of FIG. 4, the display content of FIG. 5 and other arbitrary display contents, are displayed on the same screen.

As an example, the image processing device 23 may perform control in such a way that when the blob 245 is designated in the image 211 shown in FIG. 3, the feature information table image 311 shown in FIG. 4 corresponding to the blob 245 is displayed along with the image 211 shown in FIG. 3, on the same screen.

As another example, the image processing device 23 may perform control in such away that when a row corresponding to a predetermined blob (designated row 321) is designated in the feature information table image 311 shown in FIG. 4, an image including the blob corresponding to the row is displayed along with the feature information table image 311 shown in FIG. 4, on the same screen.

In the embodiment, a configuration where a predetermined position (in the embodiment, a blob) in an image is designated by the operation of moving and clicking on the cursor is described. However, an arbitrary operation may be used as such an operation. For example, instead of the clicking operation, an operation in which the duration of the presence of the cursor at the same position exceeds a predetermined time period (an operation of not moving the cursor) may be used. Also, for example, on a touch panel or the like, a person's finger or the like may be used instead of a cursor.

As an example, if serial numbers are given to the plurality of detected blobs 231 to 248 in the image 211 as shown in FIG. 3, the image processing device 23 may be configured to switch blobs to be designated in order according to the serial numbers every time a predetermined operation (for example, pressing a predetermined key or the like) is carried out by the user.

As another example, the image processing device 23 may be configured to switch rows to be designated, one by one in order in a predetermined direction (for example, up or down) every time an operation on a key corresponding to the predetermined direction is carried out by the user in the feature information table image 311 as shown in FIG. 4. When columns are used instead of rows, left/right is used instead of up/down.

In the embodiment, there may be not only the case where only one of the plurality of detected blobs 231 to 248 is designated but also the case where two or more of the plurality of detected blobs 231 to 248 are simultaneously designated.

In the embodiment, the information about a designated blob, of the plurality of detected blobs 231 to 248, is highlighted. However, as another configuration example, a configuration where the information about all of the detected blobs 231 to 248 is highlighted may be used.

Example of Procedures of Display Processing Carried Out in Robot System

Figure 6:
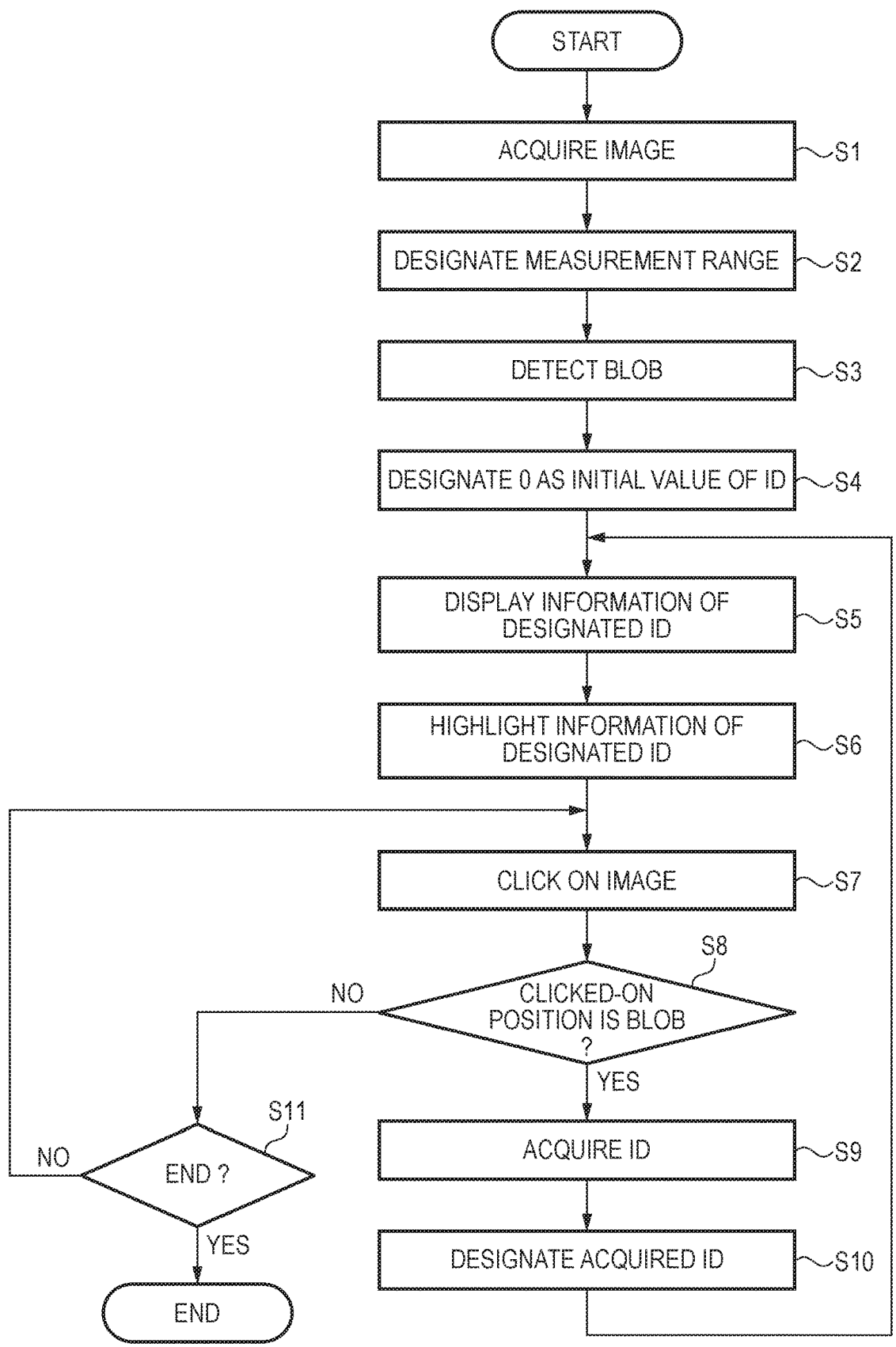
FIG. 6 shows an example of procedures of display processing carried out in a robot system according to an embodiment of the invention.

FIG. 6 shows an example of procedures of display processing carried out in the robot system 1 according an embodiment of the invention.

Step S1

First, an image is acquired in the robot system 1. Specifically, an image of the target objects 61-1 to 61-4 placed and moved on the conveyor belt 51 is picked up by the camera 22. Then, the robot system 1 shifts to the processing of Step S2.

Step S2

Next, in the robot system 1, the designation of a predetermined range (measurement range) in the image picked up by the camera 22 is accepted as a target range (measurement range) of predetermined image processing carried out by the image processing device 23. Then, the robot system 1 shifts to the processing of Step S3. In the embodiment, this target range is also called a search window.

The designation at this point may be, for example, carried out by the user or automatically carried out. This designation is carried out, for example, on the development PC 601.

Step S3

The image processing device 23 carries out predetermined image processing on the information of the image picked up by the camera 22. In the embodiment, as this image processing, the image processing device 23 carries out processing of detecting a blob in the image. The image processing device 23 transmits information of the result of the image processing to the development PC 601 via the robot control device 12. The development PC 601 receives this information. Then, the image processing device 23 shifts to the processing of Step S4.

Step S4

The development PC 601 accepts the designation of an initial value of the identification information (ID) of the blob, for the detected blob. Then, the processing shifts to Step S5.

The designation at this point is automatically carried out but may be carried out based on an operation carried out by the user. In the embodiment, 0 is designated as the initial value of the identification information of the blob.

Step S5

The image processing device 23 performs control in such a way that information about the blob corresponding to the designated identification information is displayed. Then, the image processing device 23 shifts to the processing of Step S6.

In the embodiment, the image processing device 23 performs control in such a way that the image 211 of the result of blob detection as shown in FIG. 3 is displayed and that the feature information table image 311 as shown in FIG. 4 corresponding to the designated identification information is displayed. The image 211 and the feature information table image 311 include the information of the blob corresponding to the designated identification information.

Step S6

The image processing device 23 performs control in such a way that the information about the blob corresponding to the designated identification information is highlighted when displaying this information in the processing of Step S5. Then, the image processing device 23 shifts to the processing of Step S7.

In the embodiment, the image processing device 23 performs control in such a way that the contour of the blob corresponding to the designated identification information is highlighted when displaying the image 211 of the result of blob detection as shown in FIG. 3. In the embodiment, the image processing device 23 performs control in such a way that the row of the blob corresponding to the designated identification information is highlighted when displaying the feature information table image 311 as shown in FIG. 4.

In the display processing in Step S5 and Step S6, when in the initial state or when there is no information about the blob corresponding to the designated identification information, other information may be displayed.

Step S7

The image processing device 23 accepts information of a position designated in the image (here, as an example, the image 211 as shown in FIG. 3), based on an operation carried out by the user (for example, an operation on the development PC 601). Then, the image processing device 23 shifts to the processing of Step S8.

In the embodiment, as the operation to carry out this designation, a clicking operation on the operation unit (for example, a mouse, touch panel, or the like) is used.

Step S8

The image processing device 23 determines which blob the position designated in the image 211 (in the embodiment, the clicked-on position) corresponds to.

If, as the result of this determination, the position designated in the image 211 is a position corresponding to one of the blobs (YES in Step S8), the image processing device 23 shifts to the processing of Step S9.

Meanwhile, if, as the result of this determination, the position designated in the image 211 is not a position corresponding to any blob (NO in Step S8), the image processing device 23 shifts to the processing of Step S11. The image processing device 23 may also shift to the processing of Step S11, for example, if the state where the designation of a position is not accepted continues for a predetermined time period.

Step S9

The image processing device 23 acquires (specifies) the identification information of the blob corresponding to the position designated in the image 211. Then, the image processing device 23 shifts to the processing of Step S10.

Step S10

The image processing device 23 designates the acquired identification information. Then, the image processing device 23 shifts to the processing of Step S5.

Step S11

The image processing device 23 determines whether an instruction to end the display processing is accepted or not, based on an operation carried out by the user (for example, an operation on the development PC 601).

If, as the result of this determination, it is determined that an instruction to end the display processing is accepted (YES in Step S11), the image processing device 23 ends the display processing.

Meanwhile, if, as the result of this determination, it is determined that an instruction to end the display processing is not accepted (NO in Step S11), the image processing device 23 shifts to the processing of Step S7.

Here, as an operation for the user to give an instruction to end the display processing, an arbitrary operation may be used. For example, a clicking operation on a predetermined button provided in the image 211 or another part may be used. As another example, the image processing device 23 may display a button or the like for accepting an instruction to end the display processing, at a predetermined timing, and may determine whether an instruction to end the display processing is given or not, based on whether an operation on the button or the like is carried out or not.

Setting of Condition for Predetermined Processing

The development PC 601 sets a condition for predetermined processing carried out by the robot 11. For example, the development PC 601 sets a condition for predetermined processing carried out by the robot 11, based on a part or the entirety of the information displayed by the display device 621. For example, the development PC 601 stores information of this condition into a storage unit (storage unit of the development PC 601).

The predetermined processing is, for example, processing carried out based on a part or the entirety of the information displayed by the display device 621. As an example, this may be processing of inspection on a target object (in the example of FIG. 1, target objects 61-1 to 61-4) or noises or the like, or may be processing of picking a target object (in the example of FIG. 1, target objects 61-1 to 61-4) (processing of selectively extracting a target object). Also, the predetermined processing is, for example, processing carried out based on the information which is displayed by the display device 621 and designated (selected) by the user.

As the condition for predetermined processing, for example, a value or range of a parameter (property) used in the predetermined processing may be used.

As an example, information for recognizing (determining) that an object is a target object (an example of a workpiece) may be used as the condition for predetermined processing.

As a specific example, the condition may be that if the area of a candidate of a target object falls within a range between an upper limit value (predetermined threshold corresponding to an upper limit) and a lower limit value (predetermined threshold corresponding to a lower limit), this candidate is determined as a target object. In this case, the development PC 601 sets a value of the parameter representing the upper limit value and a value of the parameter representing the lower limit value (or values of the parameter representing the range).

Here, the development PC 601 may set the condition, for example, based on an operation carried out by the user, or may automatically set the condition, following predetermined procedures. Alternatively, at the development PC 601, the condition may be set by the user describing a value of the parameter or the like in a program (program which causes the robot control device 12 to operate).

The user sets the condition for predetermined processing, for example, based on a part or the entirety of the information displayed by the display device 621. This information may be, for example, information of the area of each of detected blobs, or may be other information about each of detected blobs. As an example, viewing the information of the area of each of detected blobs, the user can set a threshold of the area to determine whether an object is a target object (for example, upper limit value or lower limit value).

The processing of determining that an object is a target object is substantially the same as the processing of determining that an object is not a target object. Therefore, the condition for determining that an object is a target object may be used as the condition for determining that an object is not a target object. That is, as an example, the development PC 601, the image processing device 23, or the robot control device 12 can extract and process a blob which is determined as a target object, based on the condition for determining that an object is a target object. As another example, the development PC 601, the image processing device 23, or the robot control device 12 can extract and process a blob which is determined as not a target object (for example, noise or the like).

Predetermined Processing

The predetermined processing carried out by the robot 11 may be arbitrary processing.

As an example, the robot 11 may carry out inspection processing on a target object or an object other than the target object. For example, the robot control device 12 executes an operation for carrying out a predetermined inspection, by controlling the robot 11 to grasp and move an object which is determined as a target object, or another object, with the end effector E1 of the robot 11.

As another example, the robot 11 may carry out processing of picking a target object or an object other than the target object. For example, the robot control device 12 executes a picking operation by controlling the robot 11 to selectively grasp and lift an object which is determined as a target object, or another object, with the end effector E1 of the robot 11.

In such picking, the robot control device 12 may be configured, for example, in such a way that the operation accepting unit 152 accepts the designation of one blob to be a picking target from the user and that the robot control unit 153 subsequently performs control to selectively pick a blob having the same area as the area of the one blob (or a blob having an area within a predetermined difference range). Thus, for example, when there is a plurality of target objects having difference sizes (areas) on the conveyor belt 51 (or a stage or the like), the user can select a target object with a desired size in the first round, and subsequently a target object with the same size as (or close to) this can be automatically selected and picked by the robot 11.

Example of Operations Carried Out in Robot System

An example of operations carried out in the robot system 1 will be described.

First, an image is taken in by the camera 22. The image processing device 23 transmits information of the image that is taken in, to the development PC 601. The development PC 601 outputs (displays) the information of the image on the screen of the display device 621. The user designates an area (measurement range) for blob detection, on the screen. The image processing device 23 executes the processing of detecting a blob within the designated measurement range. The image processing device 23 also sets 0 as the initial value of the identification information of the blob.

At this point, for example, in the case where a condition that identification information (in the embodiment, serial numbers) is given in order from the largest area to the smallest is set as the condition at the time of blob detection processing, information about a blob with the largest area (blob with identification information 0) is highlighted from among the detected blobs.

After that, when another blob is designated, information about the designated blob is highlighted.

Here, the detected blobs 231 to 248 can include not only the blobs 244 to 247 corresponding to the target objects 61-1 to 61-4 but also the blobs 231 to 243 and 248 corresponding to other objects (scratches, uneven colors or the like).

In the embodiment, if the user wishes to acquire information of a blob, the user can have information about the blob displayed, by placing and clicking on a cursor at the position corresponding to the blob. Also, in the embodiment, the information about the designated blob is highlighted. As the information about the designated blob, for example, information highlighting a corresponding part in a result list as in the feature information table image 311 shown in FIG. 4, or information about the designated blob only as in the feature information image 411 shown in FIG. 5 may be used.

In the embodiment, processing such as inspection or picking or the like is carried out by the robot 11, based on the information of the result of blob detection. As an example, in order to set a condition for determining whether an object corresponding to a blob is a target object or not, the user can click on a specific blob that is detected, and use a value about this blob (numerical value such as area) as a reference value (for example, reference value to indicate that it is a correct target object). Also, in the embodiment, since the information about the clicked-on blob is highlighted (for example, a contour or predetermined color or the like is displayed), the user can immediately notice a mistake even if the user clicks on a wrong blob.

Figure 7:
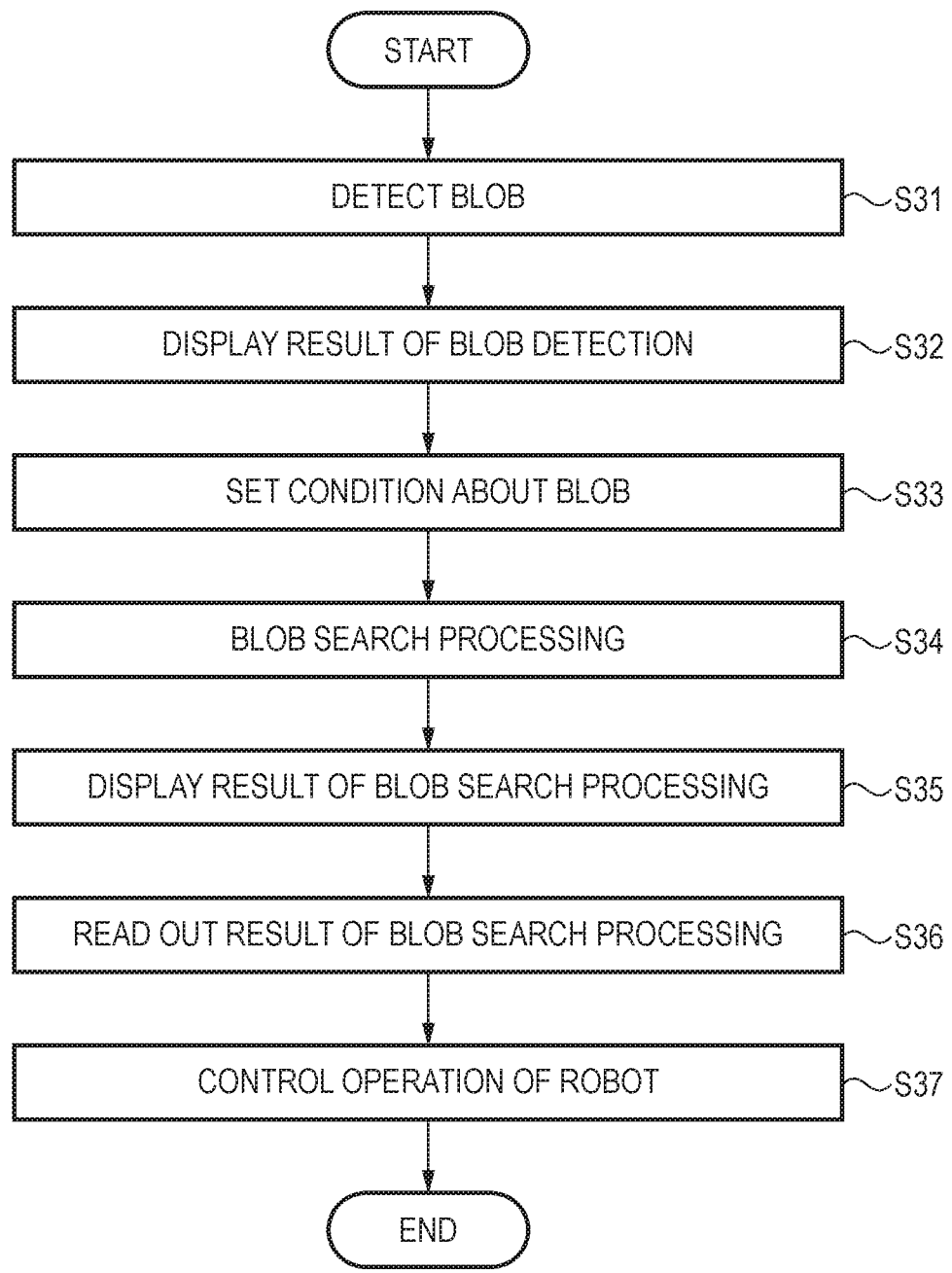
FIG. 7 shows an example of procedures of operations including condition setting carried out in a robot system according to an embodiment of the invention.

Example of Flow of Operations Including Condition Setting Carried Out in Robot System FIG. 7 shows an example of procedures of operations including the condition setting carried out in the robot system 1 according to an embodiment of the invention.

The processing flow shown in FIG. 6 and the processing flow shown in FIG. 7 may be carried out, for example, independently of each other. Alternatively, the two processing flows may be carried out in parallel. For example, the processing of Steps S1 to S3 in the processing flow shown in FIG. 6 and the processing of Step S31 in the processing flow shown in FIG. 7 may be the same processing.

Step S31

The image processing device 23 detects a blob in an image picked up by the camera 22. The processing then shifts to Step S32.

Step S32

The image processing device 23 transmits the result of the blob detection to the development PC 601. The development PC 601 displays the result of the detection on the display device 621. This display may be carried out using a table (for example, a tabular form) or the like. The user views and checks the content of this display (result of blob detection). Then the processing shifts to Step S33.

Step S33

The development PC 601 sets a condition about the blob. The processing then shifts to Step S34.

For example, the user can set a minimum value and a maximum value or the like of the area of the blob, based on the previously checked information (result of blob detection), using a screen where a property can be inputted in the blob detection processing (or blob search processing).

Such setting of the condition may be carried out, for example, based on an operation carried out by the user, or may be carried out automatically by the development PC 601.

As an example, the development PC 601 may display on the display device 621 a GUI (graphical user interface) screen generated by the image processing device 23, and may accept and set a desired condition from the user via the GUI.

In the embodiment, operations of the robot 11 are carried out, based on the content of the condition set.

Step S34

The image processing device 23 carries out processing of searching a blob (blob search processing). The processing then shifts to Step S35.

In this example, blobs are detected by the blob detection processing, and subsequently a blob that matches a condition is searched for and detected by the blob search processing after the condition is set. However, the blob detection processing and the blob search processing may be, for example, similar processing.

Step S35

The image processing device 23 transmits the result of the blob search processing to the development PC 601. The development PC 601 displays the result on the display device 621. Then, the processing shifts to Step S36. This result may include, for example, the coordinates and area of the blob, or the result on whether the blob is good or not with respect to the set condition, or the like. As an example, in the case where a maximum area and a minimum area are used as the set condition, if the area of the blob falls within the range between the minimum area and the maximum area, the blob is determined as good. Otherwise, the blob is determined as no good.

Step S36

The robot control device 12 (or development PC 601) reads out the result of the blob search processing. The processing then shifts to Step S37. This reading may be carried out, for example, using a VGet command.

The development PC 601 (or robot control device 12 as another configuration example) sets a control algorithm (for example, a program) used by the robot control device 12 so that control is performed by the robot control device 12, based on the read-out result. For example, the development PC 601 (or robot control device 12 as another configuration example) can set a processing condition that a blob determined as good is used as a processing target.

Step S37

The robot control device 12 controls an operation of the robot 11, based on the information thus acquired (coordinates of the blob, result of determination on whether the blob is good or not, or the like). The operation of the robot 11 may be, for example, moving or grasping or the like.

The robot control device 12 can also determine that processing is not carried out on a blob for which the result of the blob search processing is no good.

The setting of the condition may be carried out, for example, in the robot control device 12. As an example, the condition may be set by the user inputting a numerical value corresponding to a desired condition to a command for an operation of the robot 11.

Examples of Screen

FIGS. 8 to 14 show screens 2001 to 2007 displayed in the processing of a blob according to an embodiment of the invention.

Here, these screens 2001 to 2007 have the same schematic configuration. Each of the screens 2001 to 2007 includes an image display section 2021, a property setting display section 2022, a detection result display section 2023, an icon display section 2024, and an object execution button 3011. The information displayed inside each of the image display section 2021, the property setting display section 2022, and the detection result display section 2023 can change according to the processing status or the like.

The image display section 2021 is a section where an image is displayed.

The property setting display section 2022 is a section where a space for setting a property is displayed.

The detection result display section 2023 is a section where a result of detection is displayed.

The icon display section 2024 is a section where a plurality of icons are displayed.

The object execution button 3011 is a button to execute processing.

In this example, image processing by the image processing device 23 and display by the display device 621 are carried out under the control of the development PC 601.

Figure 8:
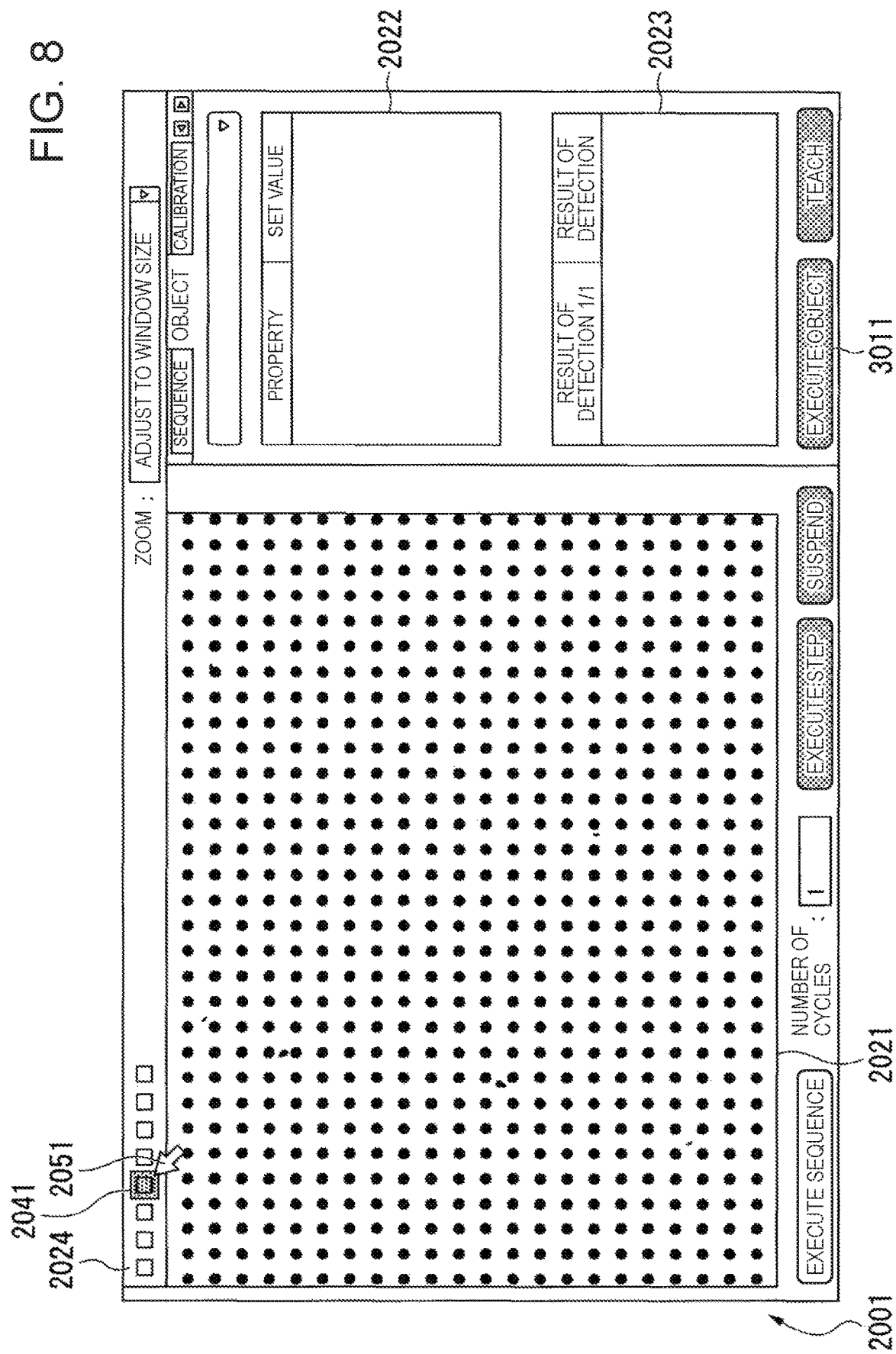
FIG. 8 shows an example of a screen displayed in blob processing according to an embodiment of the invention.

First, the screen 2001 shown in FIG. 8 is displayed.

In the example of FIG. 8, an inputted image is displayed in the image display section 2021. This image may be a binary image (for example, black-and-white image) obtained from a picked-up image. In the example of FIG. 8, this image is an image including black dots arranged vertically and horizontally at a predetermined interval.

If a cursor 2051 is placed at the position of a predetermined icon 2041 and this position is designated (for example, clicked on or the like) in response to an operation carried out by the user, the processing corresponding to the icon 2041 is carried out.

The predetermined icon 2041 corresponds to the processing of detecting a blob, based on the image.

Figure 9:
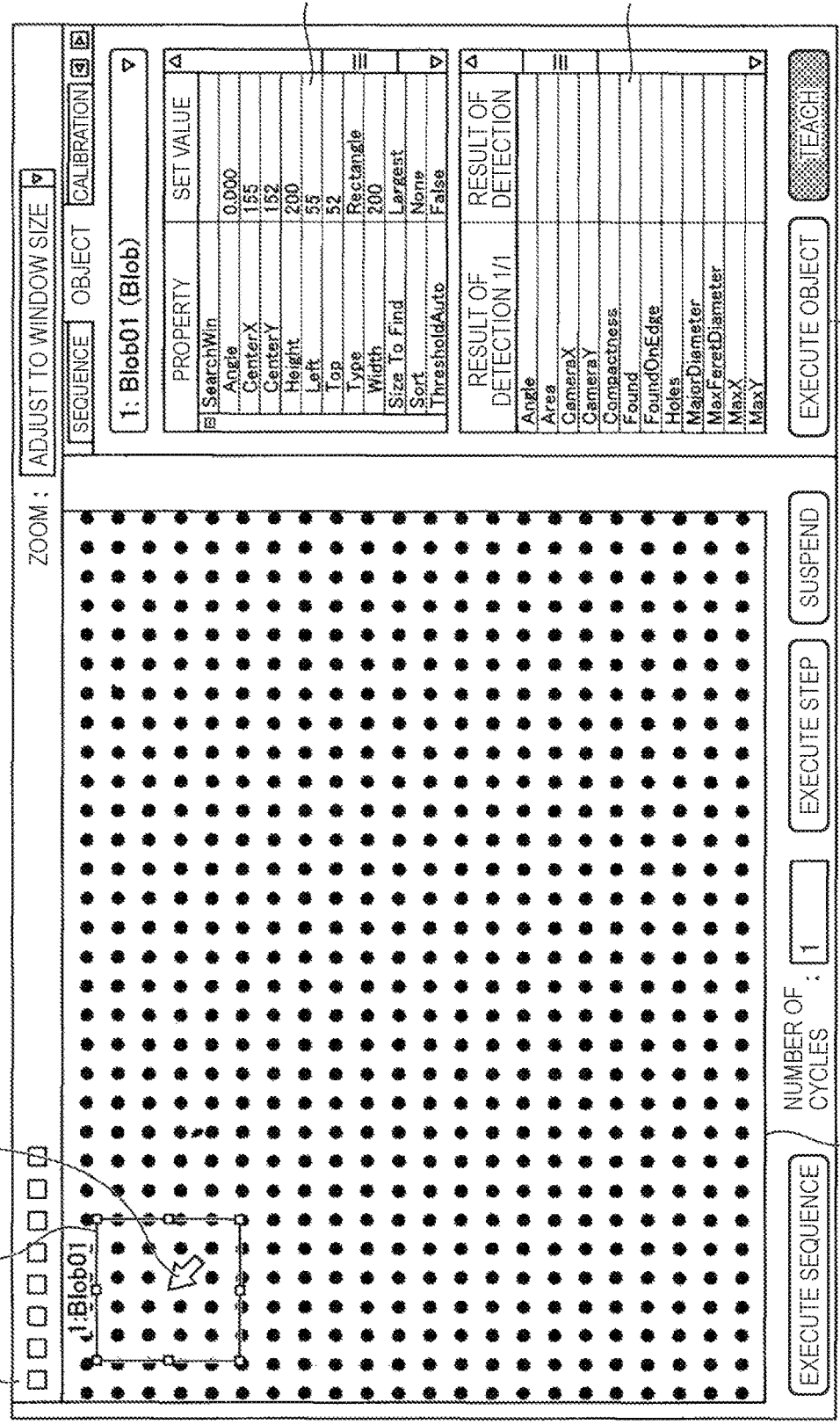
FIG. 9 shows an example of a screen displayed in blob processing according to an embodiment of the invention.

Next, the screen 2002 shown in FIG. 9 is displayed.

In the processing of detecting a blob, if the screen 2002 (for example, the area of the image display section 2021) is designated (for example, clicked on or the like) by the cursor 2051 in response to an operation carried out by the user, a search window 2111 is displayed in the image display section 2021.

The search window 2111 is a frame showing an area (measurement range) where the processing of detecting a blob is carried out in the image displayed in the image display section 2021. The search window 2111 may be, for example, a frame in a different color from its surroundings and may be in red or the like.

The values of properties of the search window 2111 (for example, the value of size, shape or the like) are initially set to a default value. The default value is a predetermined value and can be changed in response to an operation carried out by the user.

In the example of FIG. 9, the values of the properties of the search window 2111 are displayed in the property setting display section 2022. The values of the properties can be changed in response to an operation carried out by the user.

In the example of FIG. 9, the values (set values) of the properties of the search window 2111 include angle (Angle), X-coordinate value (CenterX) of the position of the centroid (or geometric center), Y-coordinate value (CenterY) of the position of the centroid (or geometric center), length in the direction of height (Height), position on the left-hand side (Left), position on the top side in the direction of height (Top), type of shape (Type), width in the lateral direction (Width), size to search for (Size To Find), sorting (Sort), and automatic threshold determination (ThresholdAuto).

Here, the area of the image display section 2021 is expressed by a plane on an X-Y orthogonal coordinate system. The X-coordinate corresponds to the lateral direction. The Y-coordinate corresponds to the direction of height (longitudinal direction).

In the example of FIG. 9, rectangle (Rectangle) is used as the type of shape (Type). However, other shapes may be used. For example, shapes such as circle or ellipse may be used.

In the example of FIG. 9, the maximum size (Largest) is set as the size to search for (Size To Find). Not necessary (None) is set as the sorting (Sort). Failure (False) is set as the automatic threshold determination (ThresholdAuto).

Figure 10:
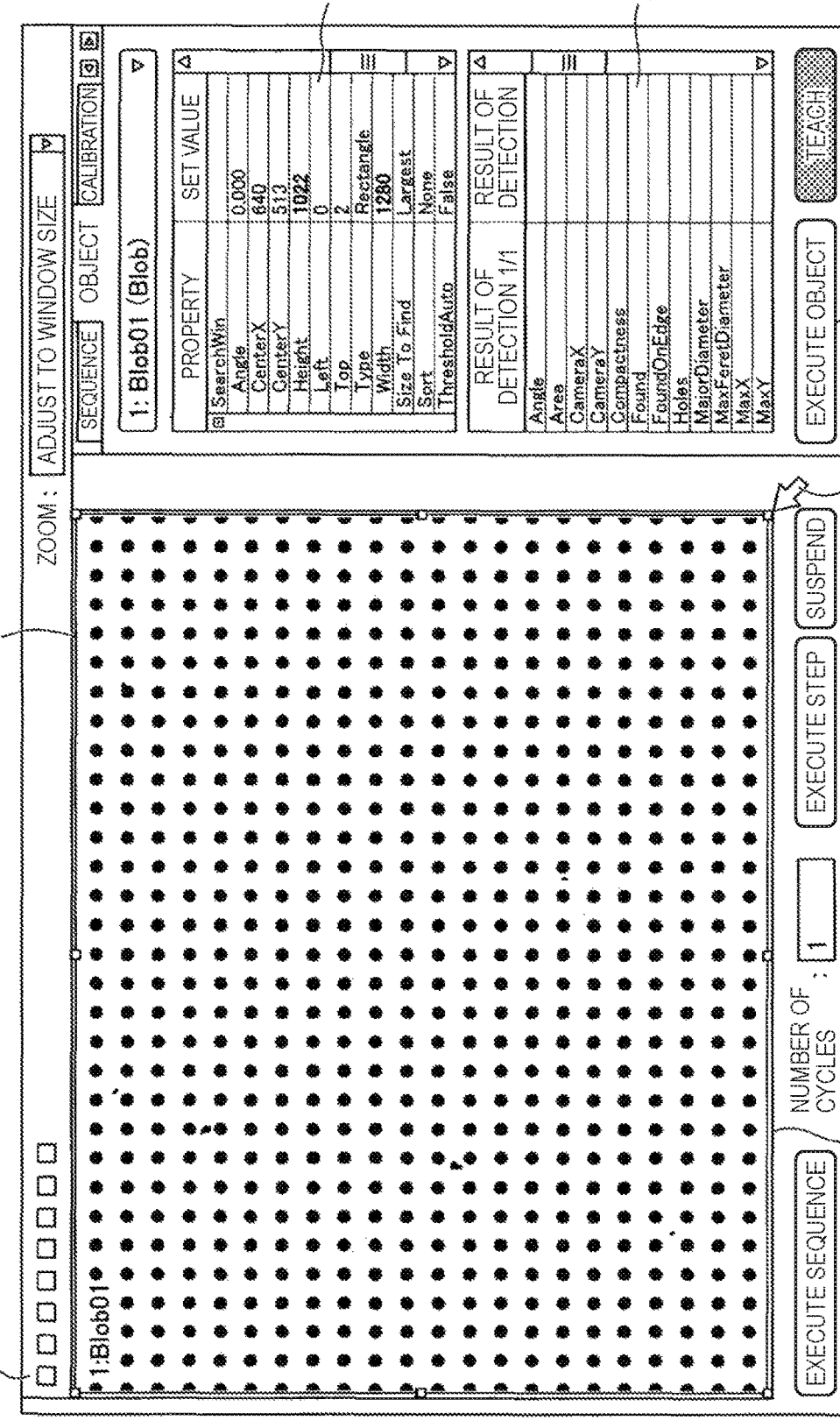
FIG. 10 shows an example of a screen displayed in blob processing according to an embodiment of the invention.

Next, the screen 2003 shown in FIG. 10 is displayed.

In the screen 2003, the cursor 2051 is moved in response to an operation carried out by the user on the screen 2002 shown in FIG. 9. As the cursor 2051 is moved, the search window 2111 is changed (moved and enlarged/reduced) in the image display section 2021 with this movement.

In the example of FIG. 10, the search window 2111 is enlarged to the same size (or substantially the same size) as the image display section 2021.

Next, the detection of a blob is carried out in response to a predetermined operation carried out by the user. The predetermined operation is an operation of placing the cursor 2051 at the position of the object execution button 3011 and designating (for example, clicking on) this position.

Figure 11:
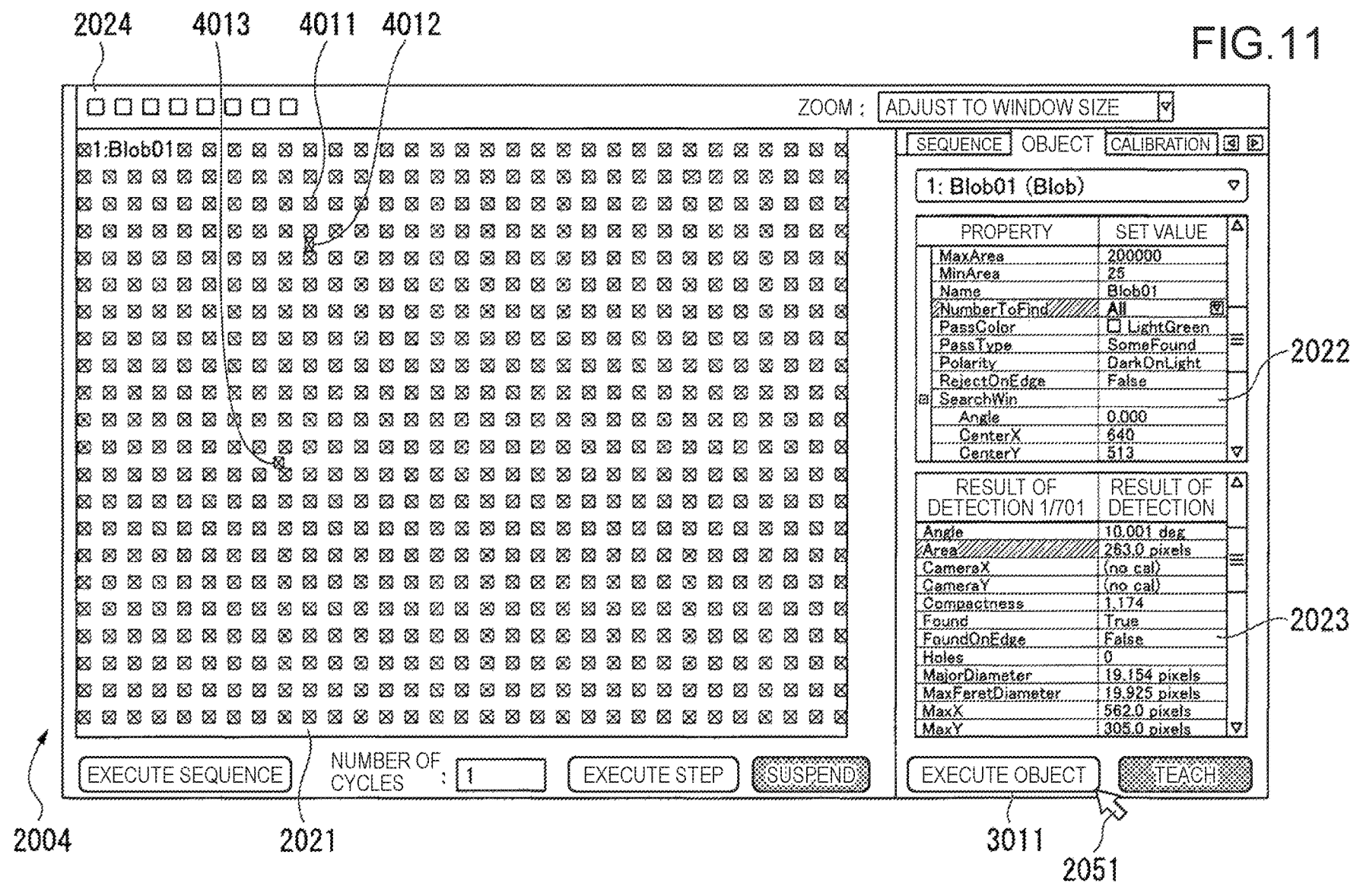

Thus, the screen 2004 shown in FIG. 11 is displayed. In the image display section 2021, the result of the blob detection processing executed based on the content of the property setting displayed in the property setting display section 2022 is displayed.

In the example of FIG. 11, detected blobs 4011 to 4013 (a part of a plurality of detected blobs is denoted by reference numbers) are displayed in the image display section 2021. The result of the detection includes the blobs 4012 and 4013 detected as a result of noises or the like, as well as the blob 4011 corresponding to a black dot included in the target image.

In the example of FIG. 11, the detected blobs 4011 to 4013 are each expressed by a mark x in a quadrilateral.

In the example of FIG. 11, the properties include maximum area to be detected (MaxArea), minimum area to be detected (MinArea), name (Name), number to search for (Number To Find), pass color (PassColor), pass type (PassType), polarity (Polarity), and reject on edge (RejectOnEdge).

For example, the maximum area to be detected (MaxArea) is 200000 and the minimum area to be detected (MinArea) is 25. In this example, these areas are expressed as the area (for example, by the number of pixels). Blobs with areas of 25 or greater and 200000 or smaller are detection targets.

The number to search for (Number To Find) is all (All).

In this example, a plurality of detected blobs are arranged in order from the largest area. In the example of FIG. 11, the result of the detection of the blob with the largest area is displayed as first information in the detection result display section 2023.

Also, in the example of FIG. 11, the result of the detection of each blob is displayed in the detection result display section 2023. The result of the detection includes angle (Angle), area (Area), camera X (CameraX), camera Y (CameraY), compactness (Compactness), whether it is found or not (Found), found on edge (FoundOnEdge), holes (Holes), outer shape (MajorDiameter), maximum Feret diameter (MaxFeretDiameter), maximum X-coordinate value (MaxX), and maximum Y-coordinate value (MaxY).

Next, it is assumed that the result of the detection (image of the result of the detection) displayed in the image display section 2021 is enlarged in response to an operation carried out by the user. The predetermined operation is an operation of selecting an enlargement ratio (the same applies to reduction), using the cursor 2051.

Figure 12:
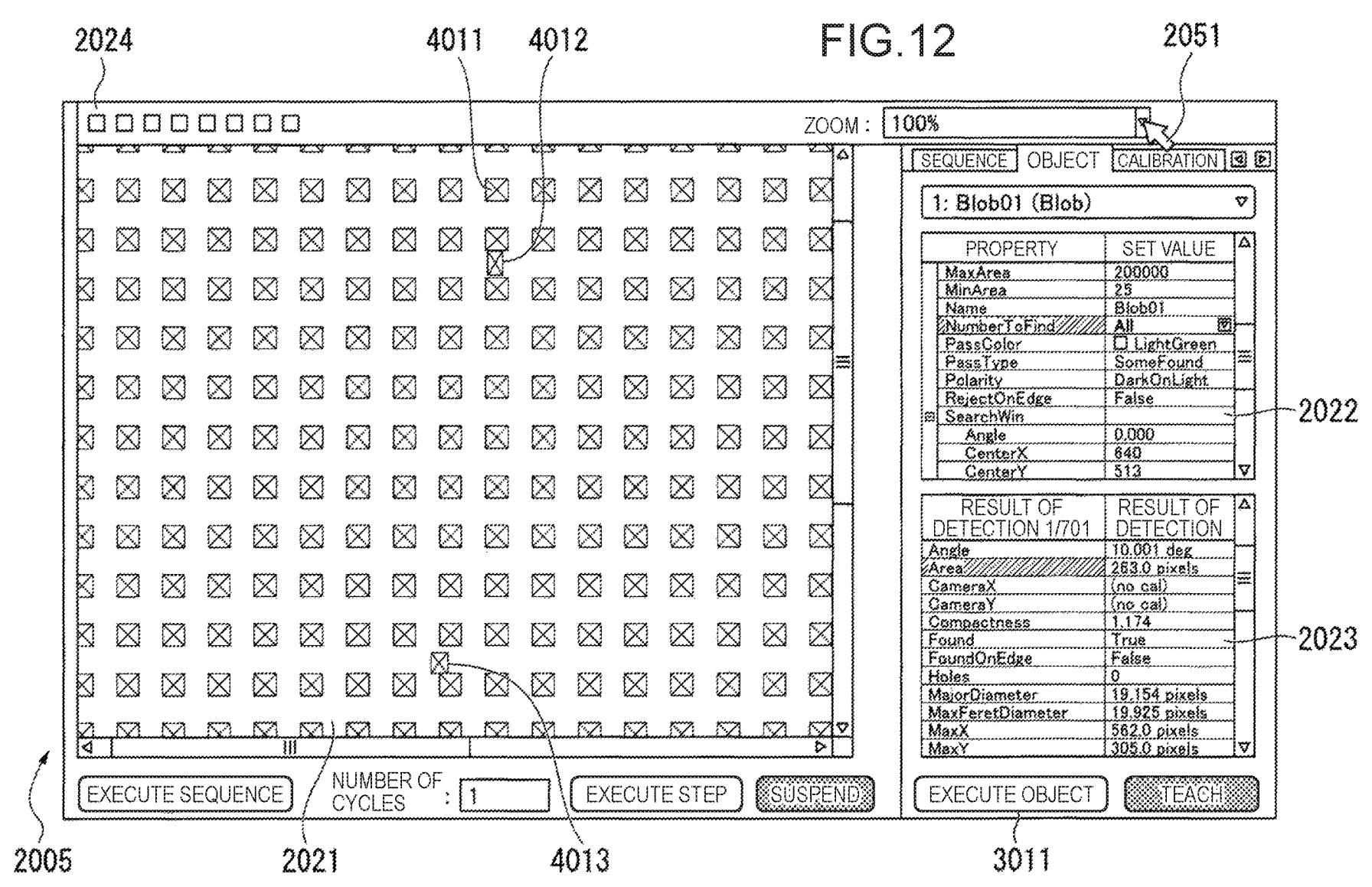

Thus, the screen 2005 shown in FIG. 12 is displayed.

In the example of FIG. 12, the result of the detection displayed in the image display section 2021 is enlarged, compared with the example of FIG. 11.

Next, it is assumed that one blob 4013 displayed in the image display section 2021 is designated in response to a predetermined operation carried out by the user. The predetermined operation is an operation of placing the cursor 2051 at the position of the blob 4013 and designating (for example, clicking on) this position.

Figure 13:
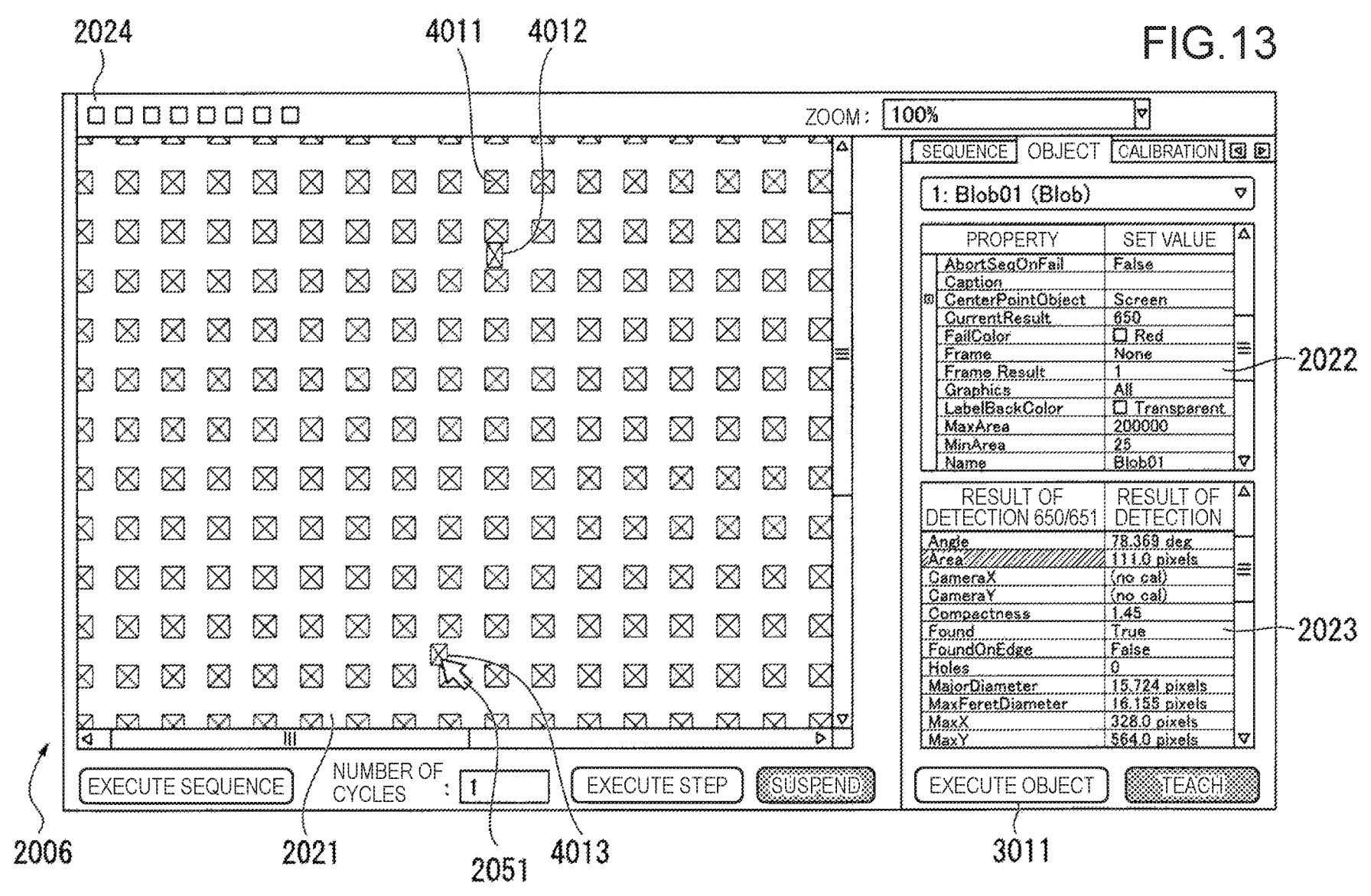

Thus, the screen 2006 shown in FIG. 13 is displayed.

In the example of FIG. 13, the result of the detection about the designated blob 4013 is displayed in the detection result display section 2023. Thus, the user can grasp information about the blob 4013, which is a noise or the like.

For example, the area of the designated blob 4013 is 111.0.

Next, it is assumed that the minimum area to be detected (MinArea) is changed in the property setting display section 2022 in response to a predetermined operation carried out by the user. The predetermined operation is an operation of placing the cursor 2051 at the position of the corresponding space and designating (for example, clicking on) this position, and inputting a value therein.

Figure 14:
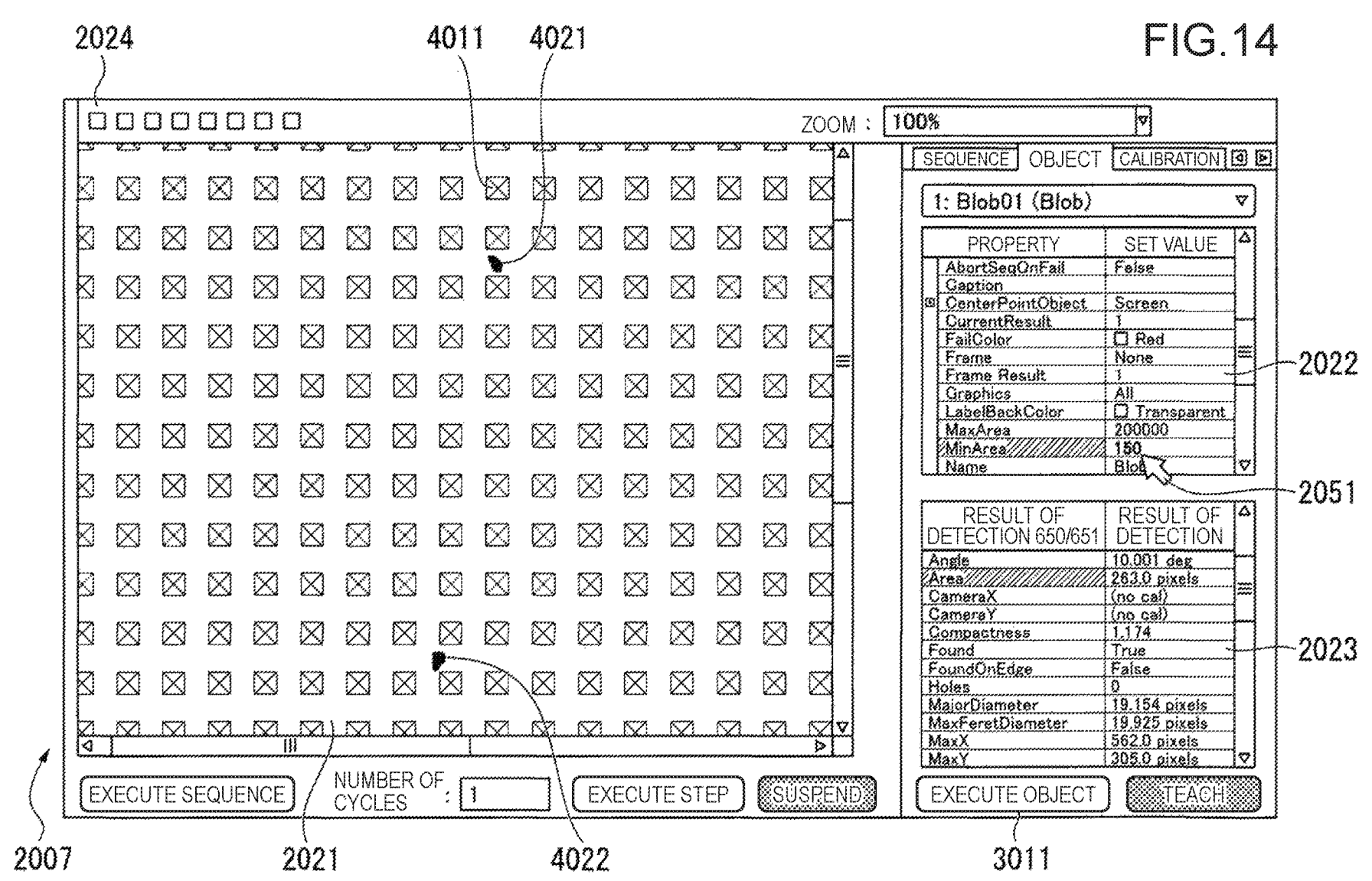

In this case, the screen 2007 shown in FIG. 14 is displayed.

In the example of FIG. 14, 150 is set as the minimum area to be detected (MinArea). Thus, in the example of FIG. 14, blobs having areas of 150 or larger and 200000 or smaller are detection targets, and parts 4021 and 4022 due to noises or the like (parts corresponding to the blobs 4012 and 4013 due to noises or the like) are not detected.

That is, in this example, by designating (selecting) the blobs 4012 and 4013 due to noises or the like, the user can examine information (in this example, the area) of these blobs. Then, based on this information, a setting not to detect the parts 4021 and 4022 due to noises or the like in the blob search processing can be made.

Here, in the processing flow shown in FIG. 7, for example, processing on the screens 2001 to 2003 shown in FIGS. 8 to 10 is carried out in the processing of Step S31 (blob detection). Processing on the screen 2004 shown in FIG. 11 is carried out in the processing of Step S32 (displaying the result of blob detection). Processing on the screens 2005 to 2007 shown in FIGS. 12 to 14 is carried out in the processing of Step S33 (setting a condition about a blob). For the screen 2007 shown in FIG. 14, the blob search processing and the display of the result of the processing are carried out in Steps S34 and S35.

Example of Hardware Configuration of Robot System

Figure 15:
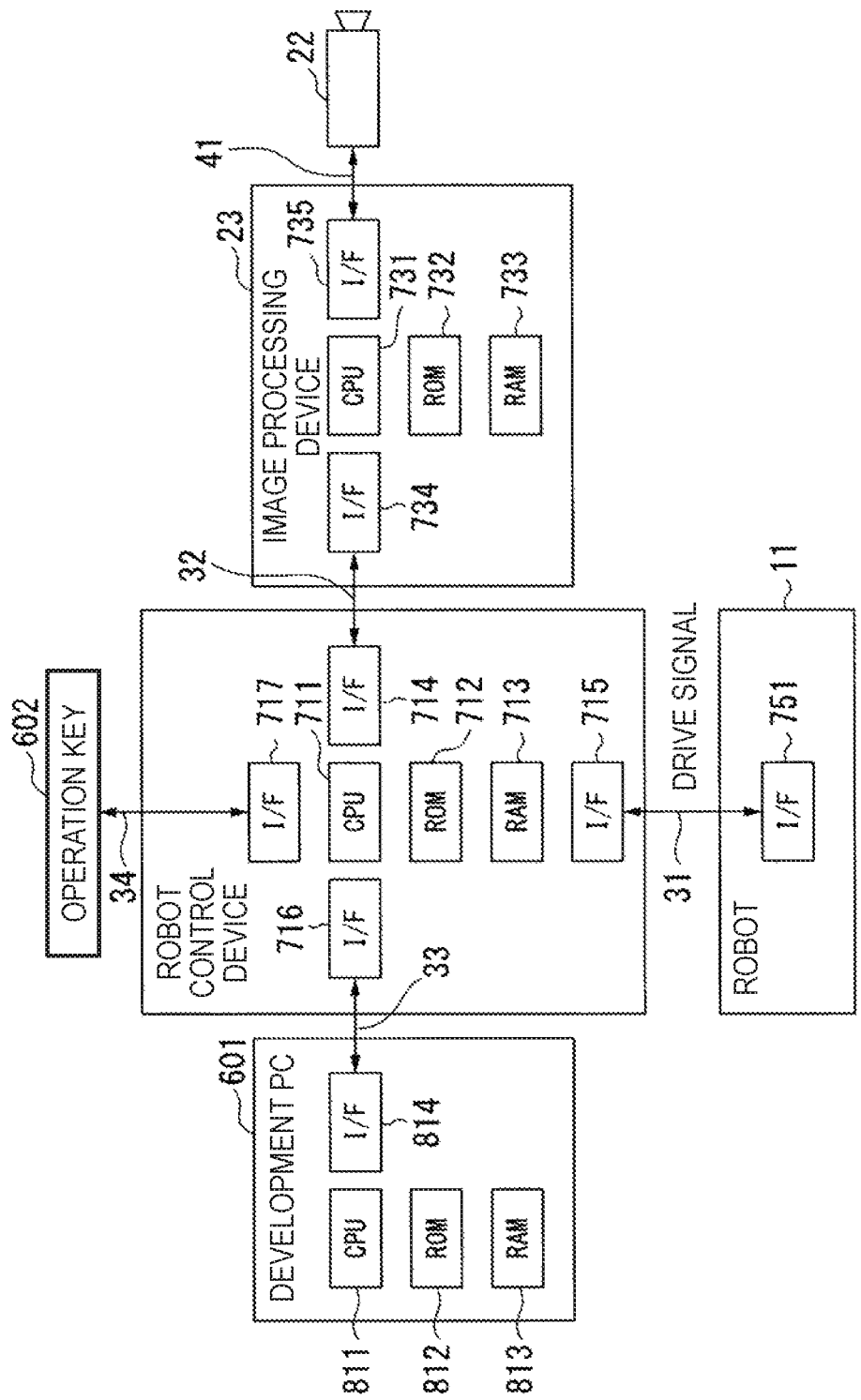
FIG. 15 shows an example of a hardware configuration of each device in a robot system according to an embodiment of the invention.

FIG. 15 shows an example of the hardware configuration of each device in the robot system 1 according to an embodiment of the invention. In the example of FIG. 15, the display devices 24 and 621 and their cables 42 and 641 are not illustrated.

FIG. 15 shows the camera 22, the image processing device 23, the robot control device 12, the robot 11, the operation key 602, the development PC 601, the cable 41 connecting the camera 22 and the image processing device 23 in a way that enables communication between these, the cable 32 connecting the image processing device 23 and the robot control device 12 in a way that enables communication between these, the cable 31 connecting the robot 11 and the robot control device 12 in a way that enables communication between these, the cable 33 connecting the development PC 601 and the robot control device 12 in a way that enables communication between these, and the cable 34 connecting the operation key 602 and the robot control device 12 in a way that enables communication between these.

Here, each of the cables 41, 31, 32, 33 and 34 may be, for example, an Ethernet (trademark registered) cable and may use, for example, USB (universal serial bus) as a connection method. The same applies to the other cables 42 and 641.

The robot control device 12 has, as its schematic hardware configuration, a Processor including a CPU (central processing unit) 711, a ROM (read only memory) 712, a RAM (random access memory) 713, and four interfaces (I/F) 714 to 717.

The four interfaces 714, 715, 716 and 717 are connected to the cable 32, the cable 31, the cable 33, and the cable 34, respectively.

The robot 11 has an interface (I/F) 751. The interface 751 is connected to the cable 31. Via this cable 31, a drive signal is transmitted from the robot control device 12 to the robot 11, and detection information from a sensor such as the force sensor 92 is transmitted from the robot 11 to the robot control device 12.

The operation key 602 is a separate unit from the robot control device 12 and accepts an operation carried out by the user. The operation key 602 may have, for example, a switch key or the like for designating the execution of processing. The operation key 602 is an example of an I/O (input/output) device.

The image processing device 23 has, as its schematic hardware configuration, a Processor including CPU 731, a ROM 732, a RAM 733, and two interfaces (I/F) 734 and 735.

The two interfaces (I/F) 734 and 735 are connected to the cable 32 and the cable 41, respectively.

The development PC 601, has as its schematic hardware configuration, a Processor including CPU 811, a ROM 812, a RAM 813, and an interface (I/F) 814. The interface (I/F) 814 is connected to the cable 33.

Examples of operations carried out in the robot system 1 shown in FIG. 15 are described as operation procedure examples 1 to 6. These examples of operations are simply examples and other arbitrary operations may be used.

In the embodiment, when preparing a program for causing the robot 11 to operate, the development PC 601 is connected to the robot control device 12. However, in the stage of mass production or the like, there are cases where the development PC 601 is disconnected from the robot control device 12.

Operation Procedure Example 1

The development PC 601 outputs a command to acquire an image, to the image processing device 23. Thus, an image is acquired. This command is relayed by the robot control device 12 between the development PC 601 and the image processing device 23. The image is an image picked up by the camera 22.

Operation Procedure Example 2

The development PC 601 acquires an image of a blob (blob image) based on the acquired image and sets a blob detection condition based on the blob image. This setting may be made, for example, by the user, or may be automatically made by a device (for example, development PC 601). As an example, properties as detection conditions may be set using the screens 2001 to 2007 shown in FIGS. 8 to 14.

Operation Procedure Example 3

The development PC 601 prepares a program on which the set condition is reflected, based on the content of the setting of the blob detection condition, and stores (saves) the program, for example, in the storage unit 113 (for example, ROM 712) of the robot control device 12.

Operation Procedure Example 4

The robot control device 12 outputs a command for blob search processing to the image processing device 23. Thus, the image processing device 23 carries out the blob search processing.

Operation Procedure Example 5

The image processing device 23 transmits information of the result of the blob search processing to the robot control device 12. Thus, the robot control device 12 acquires the information of the result of the blob search processing from the image processing device 23.

Operation Procedure Example 6

The robot control device 12 controls operations of the robot 11, based on the acquired information of the result of the blob search processing. At this point, the robot control device 12 outputs a direct drive signal to the robot 11 and also acquires the information of the result of detection by the sensor from the robot 11 and performs feedback control or the like according to need.

Development PC, Image Processing Device, and Robot Control Device

In the embodiment, the image processing device 23 executes predetermined image processing (in the embodiment, processing for detecting a blob, based on a picked-up image). The development PC 601 sets a condition for predetermined processing, based on the information of the result of the image processing. The robot control device 12 controls the execution of the processing by the robot 11.

Here, the content of predetermined image processing carried out by the image processing device 23 is not limited to the content of the image processing in this embodiment. For example, the content of image processing may be more or less than and different from the content of the image processing in the embodiment. In this case, for example, the processing carried out by the image processing device 23 need not be carried out by the development PC 601 or the robot control device 12, and the processing carried out by the development PC 601 or the robot control device 12 need not be carried out by the image processing device 23.

In the embodiment, the development PC 601 is configured to control the processing at the time of development. However, as another configuration example, the robot control device 12 or the image processing device 23 may have all or a part of the functions of the development PC 601.

That is, provided that necessary processing is executed in the overall processing including the processing carried out by the development PC 601, the processing carried out by the image processing device 23 and the processing carried out by the robot control device 12, each of the devices (development PC 601, image processing device 23, robot control device 12) may be in charge of various parts of the processing.

As an example, the functions of the image processing device 23 may be unified with the robot control device 12. That is, the robot control device 12 may include the functions of the image processing device 23.

In the embodiment, at the stage of program development, the setting and result of blob search or the like is displayed entirely on the display device 621 (monitor) of the development PC 601. As a specific example, all of the images (screens) shown in FIGS. 3 to 5 and FIGS. 8 to 14 are displayed on the display device 621 of the development PC 601.

Also, these images (screens) may be supplementarily displayed on the screen of the display device 24 by the image processing device 23.

Robot System According to Another Configuration Example

Figure 16:
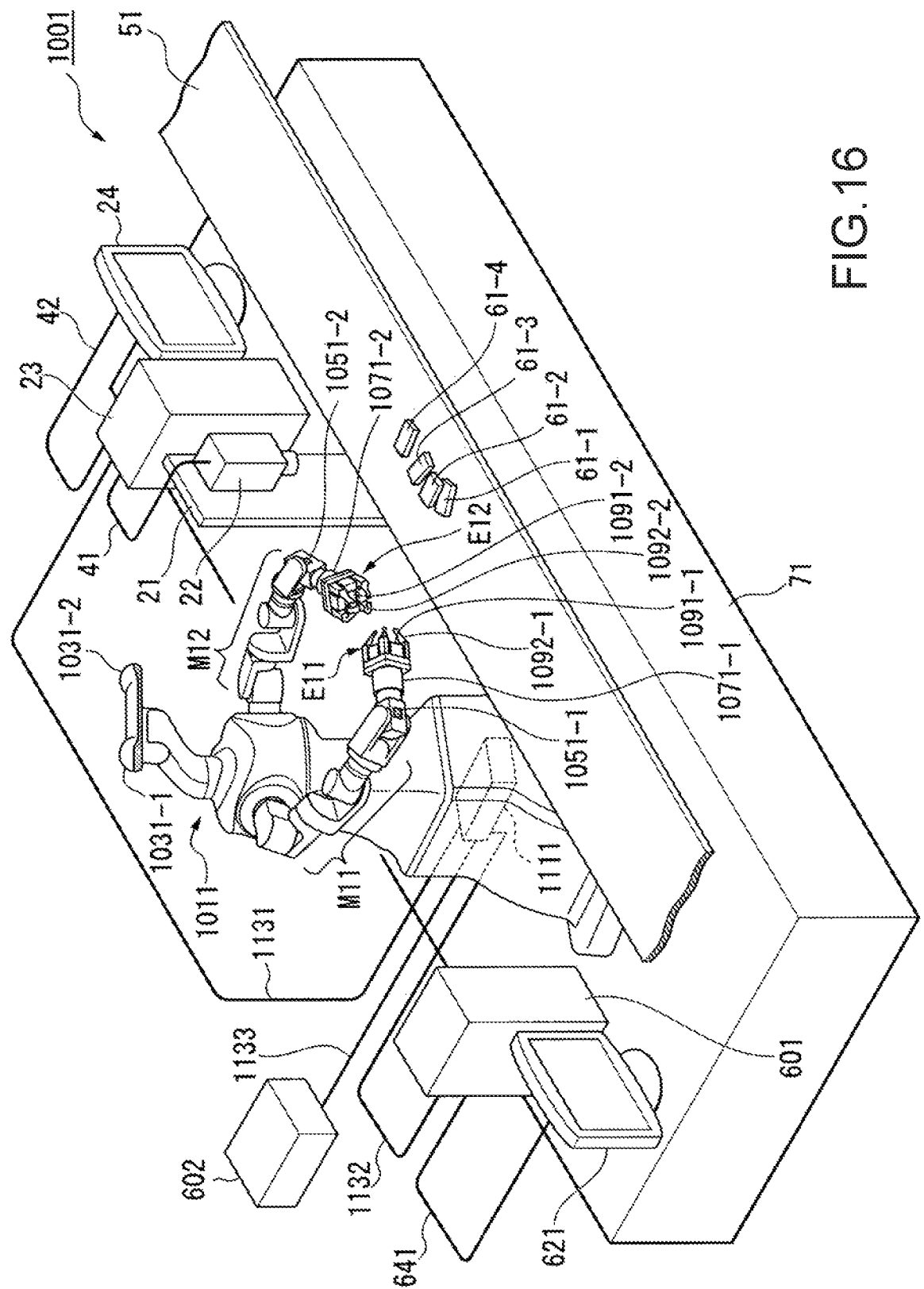
FIG. 16 shows a schematic configuration example of a robot system according to an embodiment of the invention (another configuration example).

FIG. 16 shows a schematic configuration example of a robot system 1001 according to an embodiment of the invention (another configuration example).

The robot system 1001 is different from the robot system 1 shown in FIG. 1 in that the robot system 1001 has a dual-arm robot 1011 instead of the single-arm robot 11 shown in FIG. 1. The other parts of the robot system 1001 are similar to those of the robot system 1.

Hereinafter, the difference of the robot system 1001 from the robot system 1 shown in FIG. 1 will be described in detail.

The robot system 1001 includes the robot 1011, a support unit 21, a camera 22, an image processing device 23, a display device 24, a development PC 601, an operation key 602, a display device 621, a cable 1131 connecting a robot control device 1111 provided in the robot 1011 and the image processing device 23 in a way that enables communication between these, a cable 1132 (corresponding to the cable 33 in the example of FIG. 1) connecting the development PC 601 and the robot control device 1111 in a way that enables communication between these, a cable 1133 (corresponding to the cable 34 in the example of FIG. 1) connecting the operation key 602 and the robot control device 1111 in a way that enables communication between these, a cable 41 connecting the camera 22 and the image processing device 23 in a way that enables communication between these, a cable 42 connecting the image processing device 23 and the display device 24 in a way that enables communication between these, a cable 641 connecting the development PC 601 and the display device 621 in a way that enables communication between these, a conveyor belt 51, a plurality of (in the example of FIG. 16, four) target objects 61-1 to 61-4, and a table 71.

Dual-Arm Robot

The robot 1011 has a head part at the top, a torso part in the middle, a pedestal part at the bottom, and arm parts provided on the torso part.

The robot 1011 is a dual-arm robot having two arms as arm parts.

The robot 1011 has a first manipulator M11, a first force sensor 1071-1, and a first end effector E11, as the configuration on the side of one arm. These are unified together. In this embodiment, the first force sensor 1071-1 is provided between the first manipulator M11 and the first end effector E11.

The robot 1011 has a second manipulator M12, a second force sensor 1071-2, and a second end effector E12, as the configuration on the side of the other arm. These are unified together. In this embodiment, the second force sensor 1071-2 is provided between the second manipulator M12 and the second end effector E12.

In the embodiment, with the configuration on the side of the one arm (the first manipulator M11 with the first end effector E11 attached), operations with a degree of freedom based on seven axes can be carried out. With the configuration on the side of the other arm (the second manipulator M12 with the second end effector E12 attached), operations with a degree of freedom based on seven axes can be carried out. As another configuration example, a configuration where operations with a degree of freedom based on six or fewer axes or eight or more axes are carried out may be used.

Here, in the case where the manipulators M11 and M12 operate with a degree of freedom based on seven axes, the number of attitudes that can be taken is increased, compared with the case of operating with a degree of freedom based on six or fewer axes. Therefore, the manipulators M11 and M12 can operate more smoothly and can easily avoid interference with objects existing around the manipulators M11 and M12. Also, in the case where the manipulators M11 and M12 operates with a degree of freedom based on seven axes, it is easier to control the manipulators M11 and M12 because of the smaller amount of calculations than in the case where the manipulators M11 and M12 operate with a degree of freedom based on eight or more axes. For these reasons, in the embodiment, the manipulators M11 and M12 operating with a degree of freedom based on seven axes are used as a preferable example.

In the embodiment, the torso part can rotate with a degree of freedom based on one axis at a waist part.

The robot 1011 also has two cameras (first camera 1031-1, second camera 1031-2) provided on the left and right of the head part, a camera (third camera 1051-1) provided at a predetermined site on the first manipulator M11, and a camera (fourth camera 1051-2) provided at a predetermined site on the second manipulator M12.

Each of the cameras (first camera 1031-1, second camera 1031-2, third camera 1051-1, fourth camera 1051-2) is, for example, a camera using a CCD (charge coupled device) or CMOS (complementary metal oxide semiconductor) or the like.

The first camera 1031-1 and the second camera 1031-2 are each moved according to the movement of the head part.

The third camera 1051-1 and the fourth camera 1051-2 are each moved according to the movements of the first manipulator M11 and the second manipulator M12, respectively.

The robot 1011 has the robot control device 1111. In the embodiment, the robot 1011 has the robot control device 1111 inside the pedestal part.

The robot control device 1111 controls operations of the robot 1011. The robot control device 1111 controls, for example, operations of the first manipulator M11 and the second manipulator M12. Moreover, in a configuration where the waist or other parts of the robot 1011 can move, the robot control device 1111 controls movements of the waist or other parts.

In the embodiment, each of the first camera 1031-1, the second camera 1031-2, the third camera 1051-1, and the fourth camera 1051-2 picks up an image and transmits (outputs) information of the picked-up image to the robot control device 1111. Meanwhile, each of the first force sensor 1071-1 and the second force sensor 1071-2 detects one or both of the force and moment applied to the first end effector E11 and the second end effector E12 and transmits (outputs) information of the result of the detection to the robot control device 1111. The robot control device 1111 receives (inputs) these pieces of information and can use the received information when controlling operations of the robot 1011.

Each of the first camera 1031-1, the second camera 1031-2, the third camera 1051-1, the fourth camera 1051-2, the first force sensor 1071-1, and the second force sensor 1071-2, and the robot control device 1111 are connected via a wired cable (channel) and can communicate information via this channel. Also, a wireless channel may be used instead of the wired cable.

In the embodiment, the position and attitude of the first manipulator M11, the position and attitude of the second manipulator M12, and the images picked up by the respective cameras (first camera 1031-1, second camera 1031-2, third camera 1051-1, fourth camera 1051-2) are calibrated on a coordinate system.

In the embodiment, the robot control device 1111 controls operations of the robot 1011 according to a set program (control program). The robot control device 1111 teaches the robot 1011 (main body) various kinds of necessary information for realizing the operations of the robot 1011.

As a specific example, the robot control device 1111 can cause the respective end effectors E11 and E12 to grasp an object, by controlling operations of the respective manipulators M11 and M12. The robot control device 1111 can also cause an object grasped by each of the end effectors E11 and E12 to be moved, cause an object grasped by each of the end effectors E11 and E12 to be placed and released at a predetermined position (cancel the grasping), and cause an object grasped by each of the end effectors E11 and E12 to be processed (for example, perforated), or the like.

In the embodiment, the respective end effectors E11, E12 have palms 1091-1, 1091-2 and nails (fingers) 1092-1, 1092-2.

Robot Control Device According to Another Configuration Example

To take FIG. 2 as an example, in the embodiment, the robot control device 1111 has, for example, functions similar to those of the input unit 111, the output unit 112, the storage unit 113, and the control unit 114. In the embodiment, the robot control device 1111 can control an arbitrary one of the two manipulators M11 and M12. The robot control device 1111 can also control both of the two manipulators M11 and M12 collaboratively.

In the embodiment, for example, one or more of the plurality of cameras 1031-1, 1031-2, 1051-1 and 1051-2 may be used instead of the camera 22.

In the development PC 601, the dual-arm robot 1011, and the robot control device 1111, displaying information of a predetermined image on the screen of the display devices 24, 621, based on information of the result of predetermined image processing carried out by the image processing device 23, accepting an operation carried out by the user, setting a condition for predetermined processing carried out by the robot 1011, and carrying out an operation by the robot 1011, based on the set condition and the like, are executed, as in the case of the single-arm robot 11 and the robot control device 12.

Overview of Embodiment

As described above, in the robot system 1, 1001 according to the embodiment, when an image about a desired target (in the embodiment, a blob) is designated by the user in display information, another image about this target is displayed. Also, in the robot system 1, 1001 according to the embodiment, a condition for processing on an object is set by the user or automatically, based on this another image, and this processing is executed by the robot 11, 1011.

Also, in the robot system 1, 1001 according to the embodiment, when an image about a desired target is designated by the user in display information, an image about this target is highlighted.

In the robot system 1, 1001 according to the embodiment, a correspondence between a predetermined target (in the embodiment, a blob) and an image about this target is established. For example, when an image about a desired target (in the embodiment, an image of the target itself or an image including a numerical value such as its area or position) is designated by the user from among a plurality of targets, the contour or the like of the image is highlighted, and another image about this image (in the embodiment, an image including a numerical value such as its area or position, or an image of the target itself) is displayed.

In this way, in the robot system 1, 1001 according to the embodiment, by intuitively designating an image about a desired target, the user can cause another image about this target to be displayed. Such an operation of designation is easy for the user.

In the robot system 1, 1001 according to the embodiment, an original image (here referred to as an "image G0" for the sake of convenience of the description) displayed to accept the designation of an image (here referred to as an "image G1" for the sake of convenience of the description) by the user, and another image (here referred to as an "image G2" for the sake of convenience of the description) displayed in response to the designation of the image (image G1) by the user, are displayed on the same screen. Thus, it can be made easy for the user to visually grasp the corresponding relationship between these images (image G0, image G2).

In the robot system 1, 1001 according to the embodiment, since an image about a target designated by the user is highlighted, it is easy for the user to grasp the currently designated image from among a plurality of targets. That is, in the robot system 1, 1001 according to the embodiment, a highlighted image can be visually conspicuous and therefore it can be made easy for the user to grasp the image.

In this way, in the robot system 1, 1001 according to the embodiment, displaying another image about a certain image, setting a condition for processing based on information (a part or all) of this another image, and carrying out the processing can be carried out efficiently in the robot 11, 1011.

The effects described above are achieved, for example, even in the case where a large number of targets are detected. Information overload can be prevented in such a case as well.

Specific Example of Effects of Embodiment

Now, a specific example of the effects of the embodiment will be described.

An example of a technique to be compared with the embodiment (hereinafter also referred to as "comparative technical example") will be described.

In the comparative technical example, when an image as shown in FIG. 3 is displayed, serial numbers (for example, 0, 1, 2, . . . ) allocated to individual blobs are displayed near the images of the individual blobs. The user views the serial number of a desired blob in the image, then views an image as shown in FIG. 4 on a different screen from that of FIG. 3, and reads the area or the like corresponding to the serial number of the desired blob. That is, the user needs to remember a numeral in an image as shown in FIG. 3 and find desired information from an image as shown in FIG. 4, based on this numeral. However, with such a comparative technical example, if a large number of (for example, 100 or so) blobs are detected, a large number of numerals are displayed in an image as shown in FIG. 3 and this makes it harder for the user to view the image. Also, with such a comparative technical example, the user may mistake numerals (serial numbers) in an image as shown in FIG. 3, and it takes time and effort to scroll over a list to find a desired numeral (serial number) in an image as shown in FIG. 4.

Meanwhile, in the embodiment, numerals (serial numbers) corresponding to blobs need not be displayed in the image shown in FIG. 3. Therefore, this image can be made easy for the user to view. Also, in the embodiment, with respect to the image about a blob designated by the user, another image about this blob is displayed. Therefore, the time and effort for the user to find the image of a desired blob can be reduced.

In the embodiment, the case of detecting a blob in a picked-up image is described. However, the technique according to the embodiment may be applied to other cases. For example, the technique of the embodiment may be applied to the case of detecting a predetermined pattern. As the predetermined pattern, for example, a pattern based on luminance information of an image may be used. As an example, a contour pattern may be used.

Examples of Robot

The robot may be other than a vertical multi-joint single-arm robot or dual-arm robot. The technique can be applied to various types of robots.

For example, a horizontal multi-joint robot (SCARA robot) or right-angle coordinate robot may be used. The right-angle coordinate robot is, for example, a gantry robot.

Configuration Examples

As a configuration example, a robot (as an example, the robot 11 shown in FIG. 1, or as another example, the robot 1011 shown in FIG. 16) is configured in such a way that, when a first operation (operation of designation) is accepted and a second image (as an example, the image of the blob 245 shown in FIG. 3) included in a first image (as an example, the image 211 shown in FIG. 3) that is picked up is selected, a third image (as an example, the feature information table image 311 shown in FIG. 4, or as another example, the feature information image 411 shown in FIG. 5) related to the second image is displayed, that when information of the third image is accepted, a condition for processing (for example, inspection processing or picking processing or the like) on an object whose image is picked up is set based on the information, and that the processing is carried out based on the set condition.

As a configuration example, in the robot, the second image is an image corresponding to a first target (in the example of FIG. 3, the target corresponding to the blob 245), and the third image includes a numerical value (in the example of FIG. 4 and FIG. 5, numerical value of area and numerical values of coordinates) related to the first target.

As a configuration example, in the robot, the display of the second image is highlighted in the first image (in the example of FIG. 3, the contour 261 is highlighted) when the first operation is accepted.

As a configuration example, in the robot, the third image is displayed along with the first image.

As a configuration example, in the robot, the second image is an image corresponding to a second target (for example, it may be the same as or different from the first target). The third image includes a numerical value related to the second target. When a second operation (operation of designation) is accepted and a fourth image (as an example, an image of an arbitrary row in the feature information table image 311 shown in FIG. 4) related to the second target included in the third image (as an example, the feature information table image 311 shown in FIG. 4) is selected, a fifth image (as an example, an image corresponding to a designated row, for example, an image about the second target only, or the like) related to the fourth image is displayed.

As a configuration example, in the robot, when the second operation is accepted, the display of the fourth image highlighted in the third image.

As a configuration example, in the robot, the fifth image is displayed along with the third image.

As a configuration example, a robot control device (as an example, the robot control device 12 shown in FIG. 1, or as another example, the robot control device 1111 shown in FIG. 16) causes the foregoing robot to carryout the processing.

As a configuration example, a robot system (as an example, the robot system 1 shown in FIG. 1 or the robot system 1001 shown in FIG. 16) includes the foregoing robot and a robot control device which controls the robot.

As another example, a configuration example related to the screens 2001 to 2007 shown in FIGS. 8 to 14 will be described.

As a configuration example, a robot is configured in such a way that when a first operation is accepted and a second image (image of an arbitrary part, for example, image of a noise part or the like) included in a first image (image displayed in the image display section 2021) that is picked up is selected, a third image (for example, image including a numerical value of area or the like about the selected part) related to the second image is displayed, that when information of the third image is accepted, a condition for processing on an object whose image is picked up is set based on the information, and that the processing is carried out based on the set condition.

Also, a program for realizing the functions of an arbitrary part of the foregoing devices (for example, development PC 601, the image processing device 23, robot control device 12, 1111, or the like) may be recorded (stored) in a computer-readable recording medium (storage medium), and a computer system may be made to read and execute this program. The "computer system" in this case includes an operating system (OS) or hardware including peripheral devices. The "computer-readable recording medium" refers to a portable medium such as flexible disk, magneto-optical disk, ROM, or CD (compact disc)-ROM, or a storage device such as a built-in hard disk in the computer system. Also, the "computer-readable recording medium" includes a recording medium which holds the program for a predetermined period of time, such as a volatile memory (RAM) within a computer system which serves as a server or client when the program is transmitted via a network like the internet or via a communication channel such as telephone line.

The program may be transmitted from a computer system which has this program stored in a storage device to another computer system via a transmission medium or via transmission waves in a transmission medium. Here, the "transmission medium" transmitting the program refers to a medium having the function of transmitting information, such as a network (communication network) like the internet, or a communication channel (communication line) such as telephone line.

The program may be for realizing a part of the foregoing functions. Also, the program may be a program which can realize the foregoing functions in combination with a program already recorded in a computer system, that is, a so-called differential file (differential program).

The embodiment of the invention has been described in detail with reference to the drawings. However, the invention is not limited to the specific configurations described in the embodiment and includes designs and the like without departing from the scope of the invention.

The entire disclosure of Japanese Patent Application No. 2016-168961, filed Aug. 31, 2016 is expressly incorporated by reference herein.

What is claimed is:
1. A robot system comprising:
 a robot including:
  a base;
  an arm connected to the base; and
  an end effector connected to a distal end of the arm, the end effector being configured to grasp a first object among a plurality of objects;
 a camera configured to capture a first image of some of the plurality of objects, the plurality of objects being located on a plane extending along an X-axis and a Y-axis orthogonal to each other;
 a display configured to display the first image;
 an interface configured to accept input from a user; and
 a robot controller configured to control the robot, the camera, the display, and the interface, the robot controller including:
  a memory configured to store a program including computer-readable instructions; and
  a processor configured to execute the computer-readable instructions so as to:
   cause the camera to capture the first image including the first object;
   binarize the first image in response to an intensity of each pixel of the first image so as to generate a second image, the second image including a plurality of blobs, each of the plurality of blobs corresponding to a plurality of pixels having a first pixel value in the binaized first image, the first pixel value having an intensity of the pixel in the first image that is greater than a threshold intensity;

calculate a property value of each of the plurality of blobs based on the second image, the property value including an area value, an X-coordinate value along the X-axis, and a Y-coordinate value along the Y-axis of each of the plurality of blobs;

display the second image including the plurality of blobs on the display;

accept the input by the user via the interface, the input corresponding to a condition with respect to the property value;

select one or more of the plurality of blobs including a first blob based on the condition, the first blob corresponding to the first object;

display a third image on the display, the third mage including the property value of the selected blob; and cause the robot to perform an operation with respect to the selected blob based on the corresponding property value.

2. The robot system according to claim 1, wherein the operation corresponds to an inspection of the first object corresponding to the first blob.

3. The robot system according to claim 1, wherein the operation corresponds to grasping the first object corresponding to the first blob by controlling the end effector by the processor in response to the property value of the first blob.

4. The robot system according to claim 1, wherein the processor is configured to emphasize the selected blob in the second image on the display in response to the condition.

5. The robot system according to claim 1, wherein the processor is configured to display the second and third images together on the display at the same time.

* * * * *